Aug. 5, 1952　　　　　F. SCHWARZER　　　　　2,605,790
ADJUSTABLE FRAME AND HINGE RECESS LOCATING JIG ASSEMBLY
Filed July 26, 1949　　　　　　　　　　　　　12 Sheets-Sheet 1

*INVENTOR.*
FRED SCHWARZER
BY
*Woodcock and Phelan*
ATTORNEYS

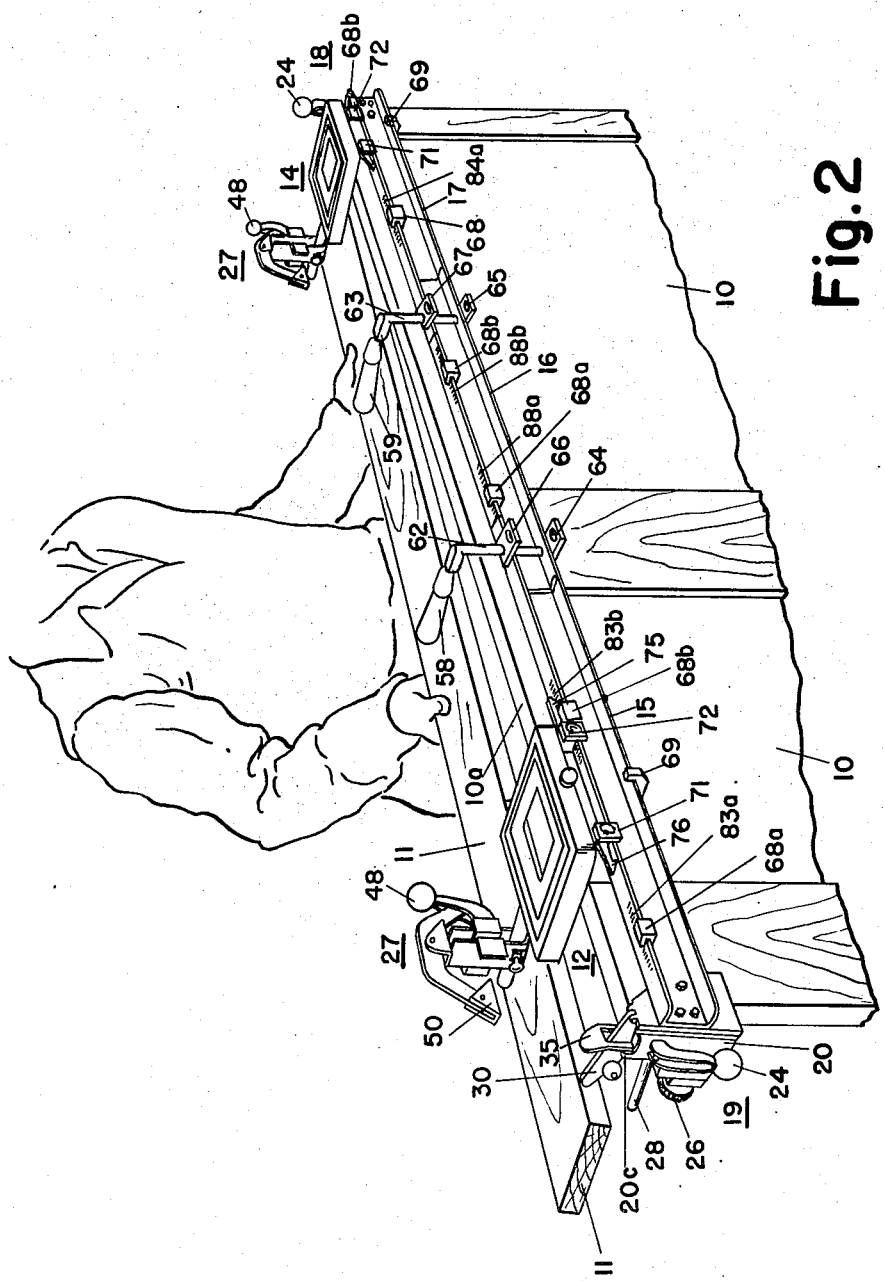

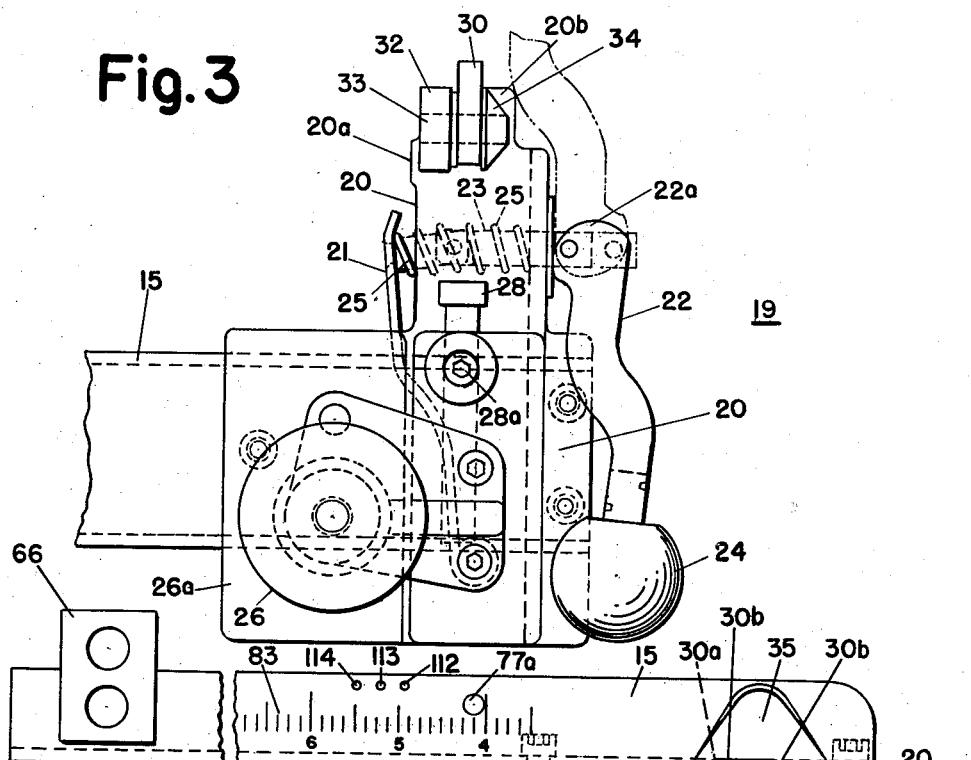

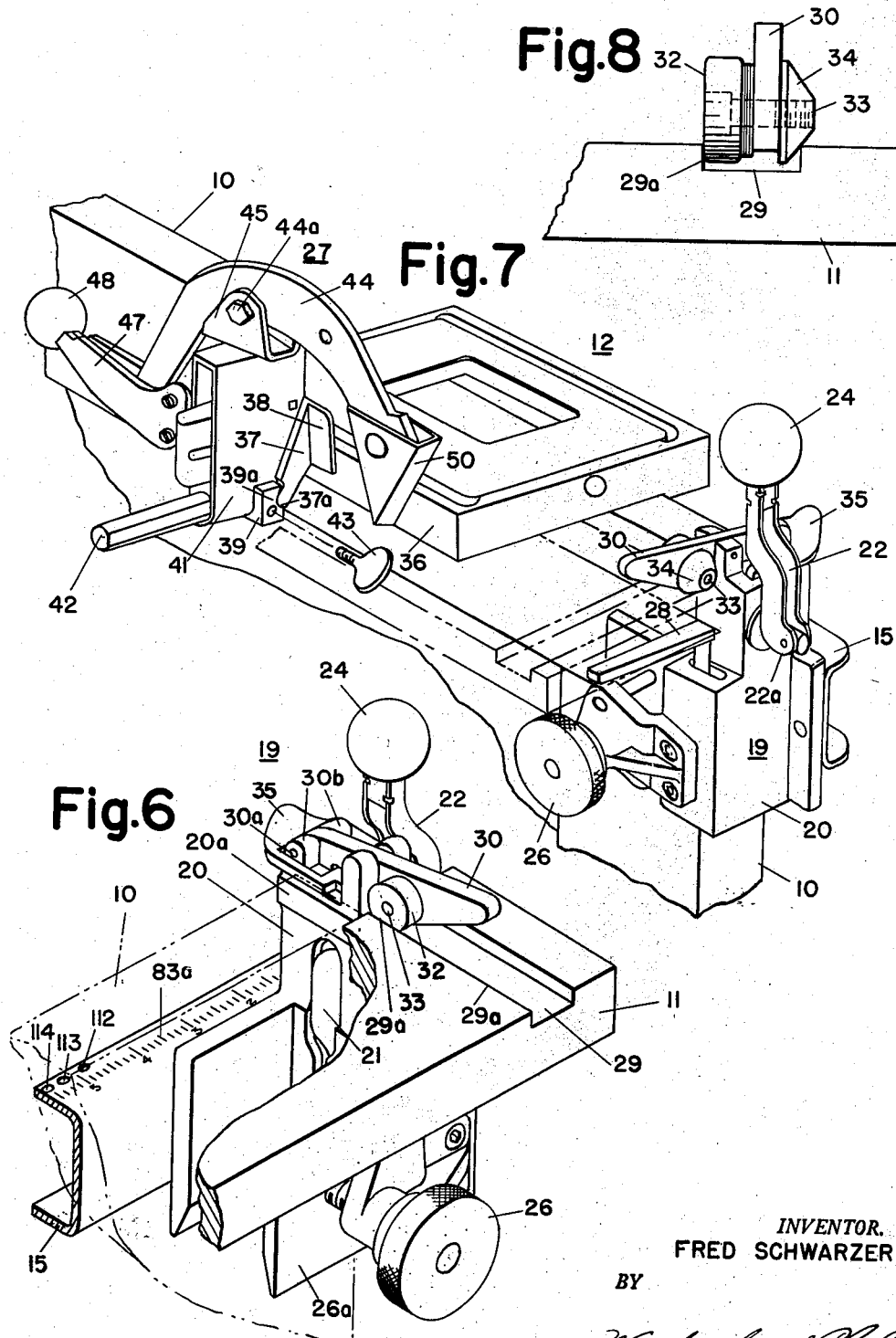

Aug. 5, 1952  F. SCHWARZER  2,605,790
ADJUSTABLE FRAME AND HINGE RECESS LOCATING JIG ASSEMBLY
Filed July 26, 1949  12 Sheets—Sheet 5
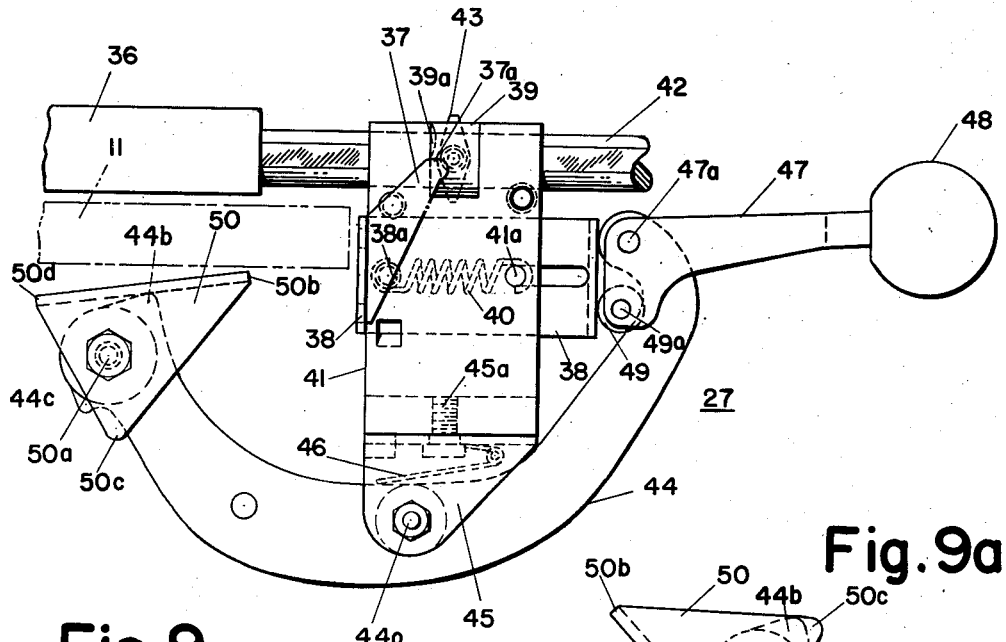
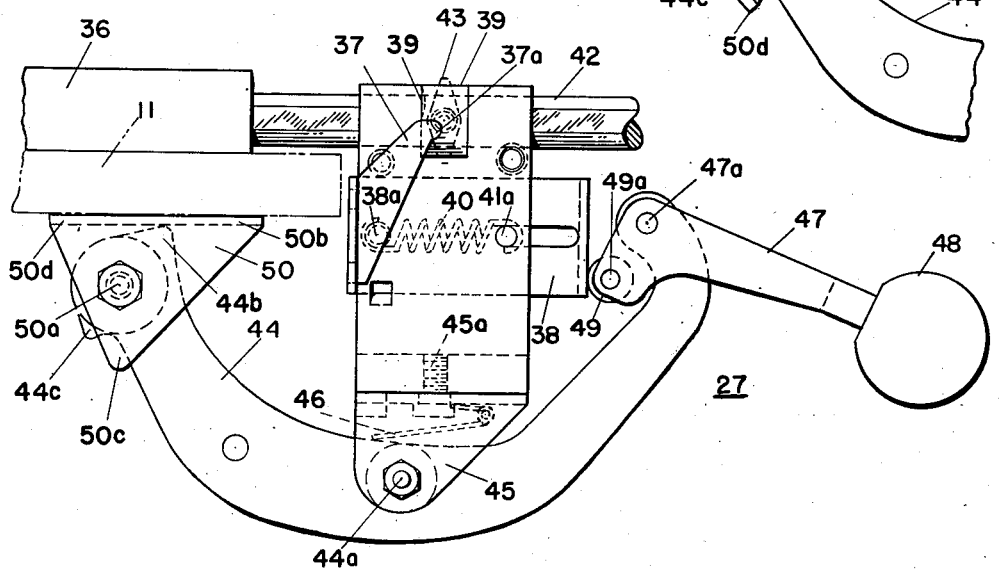
INVENTOR.
FRED SCHWARZER
BY
Woodcock and Phelan
ATTORNEYS INVENTOR.
FRED SCHWARZER
BY
Woodcock and Phelan
ATTORNEYS

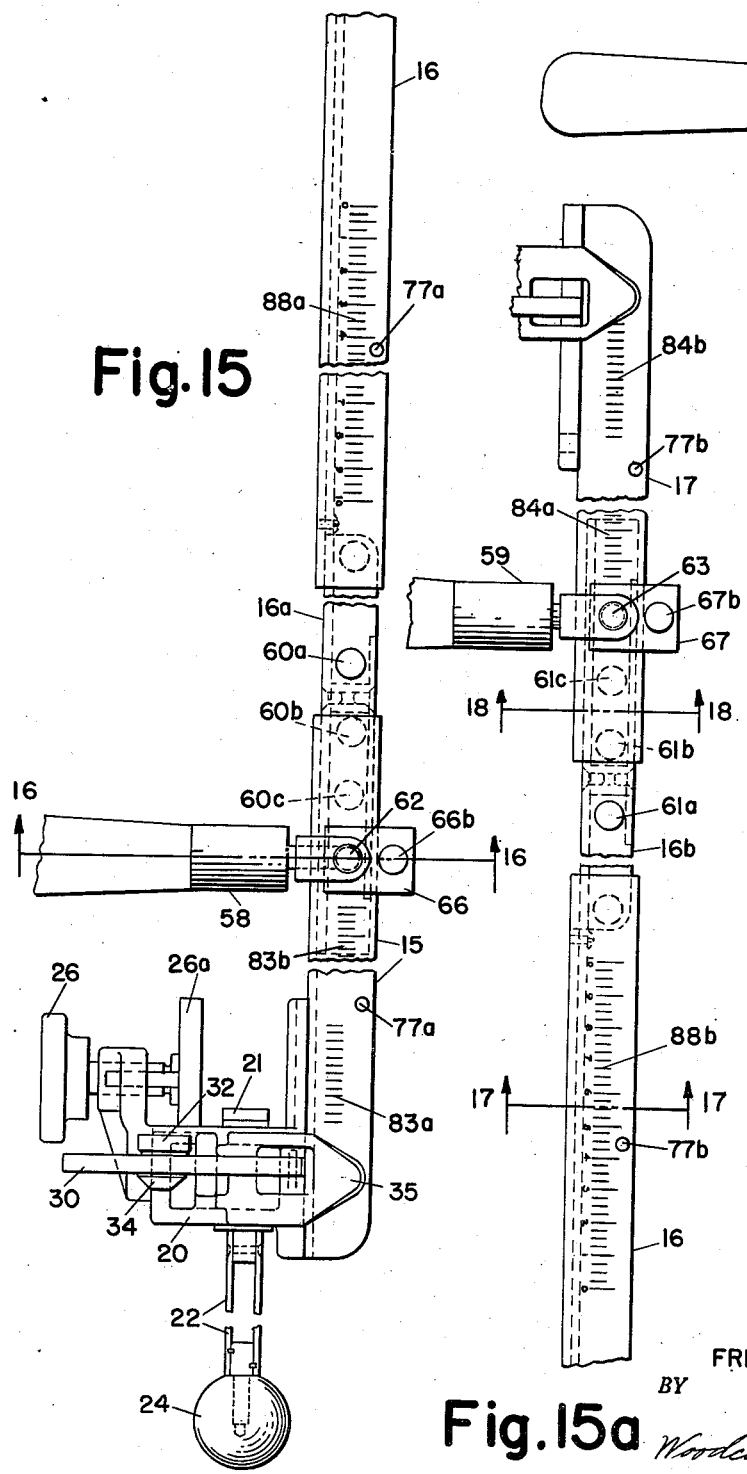

Aug. 5, 1952 — F. SCHWARZER — 2,605,790
ADJUSTABLE FRAME AND HINGE RECESS LOCATING JIG ASSEMBLY
Filed July 26, 1949 — 12 Sheets-Sheet 8

INVENTOR.
FRED SCHWARZER
BY
Woodcock and Phelan
ATTORNEYS

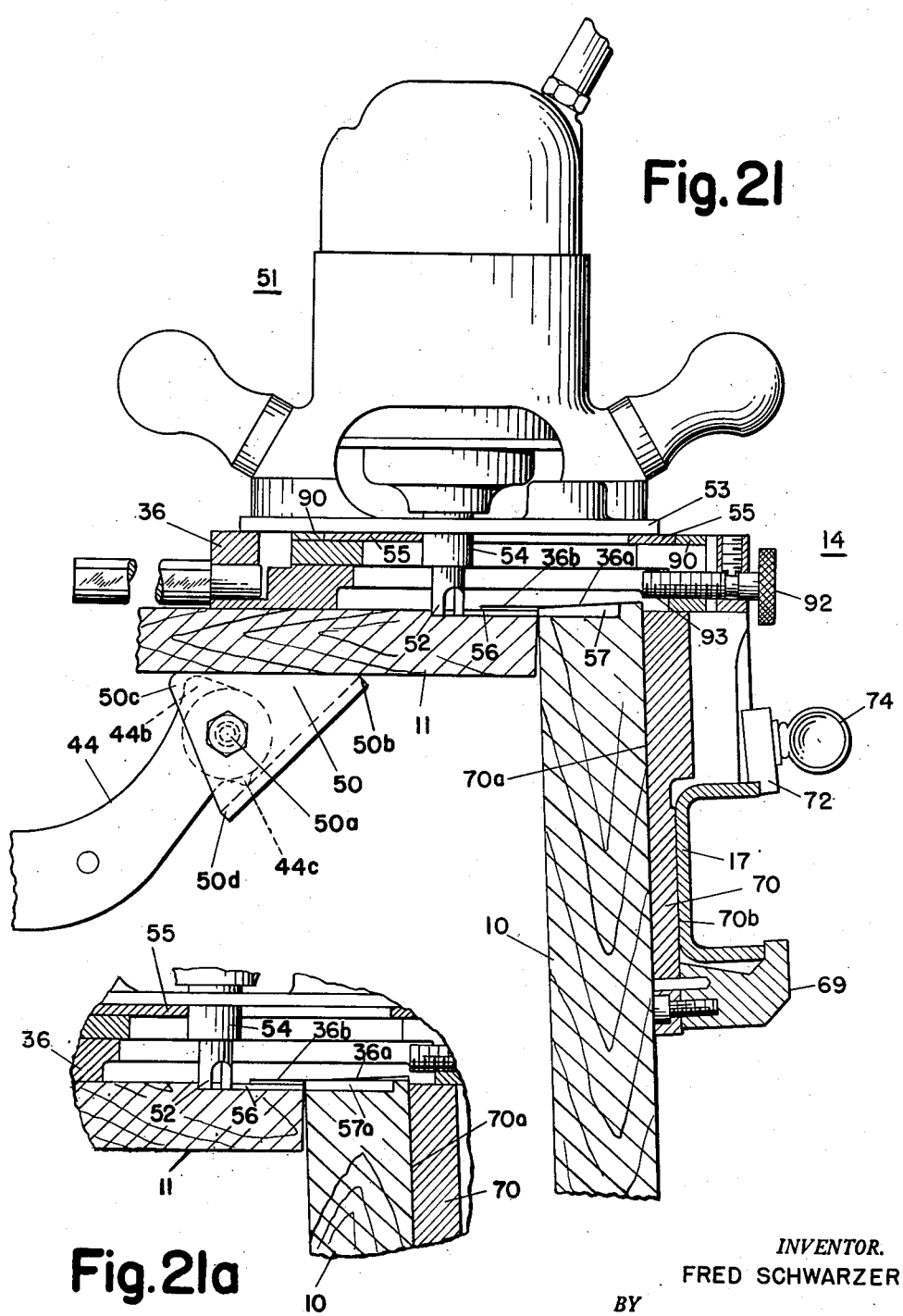

Aug. 5, 1952 F. SCHWARZER 2,605,790
ADJUSTABLE FRAME AND HINGE RECESS LOCATING JIG ASSEMBLY
Filed July 26, 1949 12 Sheets-Sheet 10
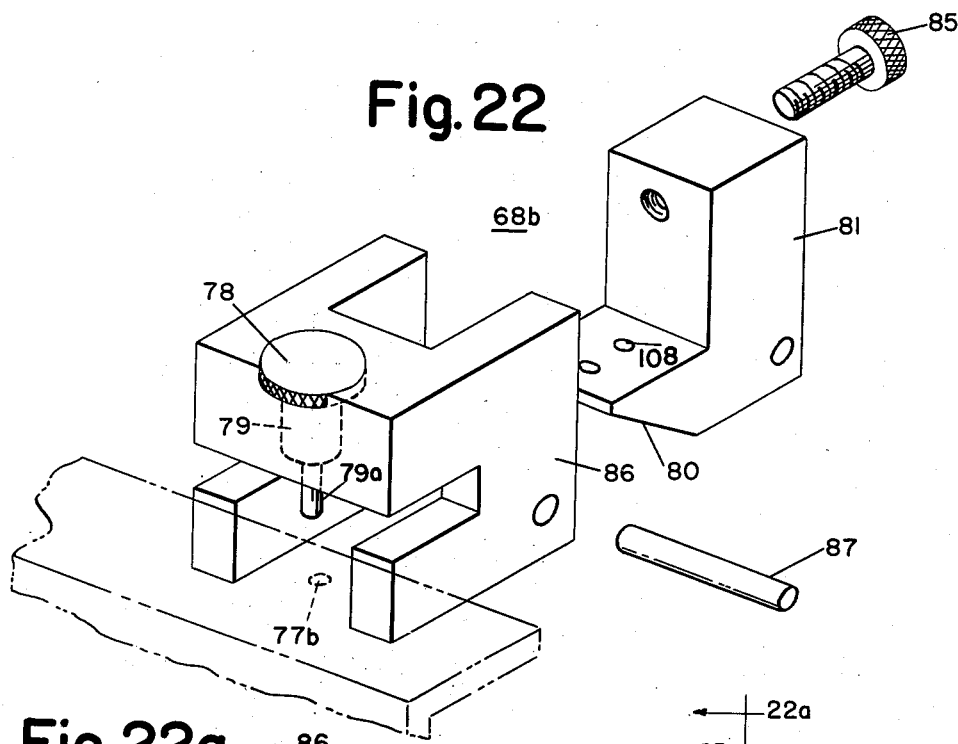
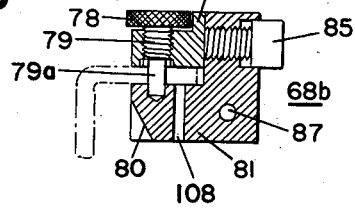
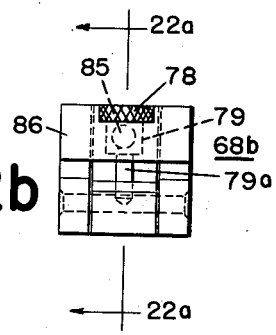
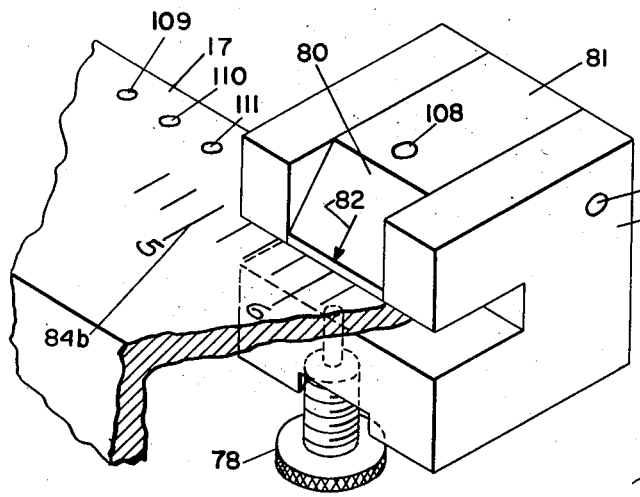
INVENTOR.
FRED SCHWARZER
BY
Woodcock and Phelan
ATTORNEYS

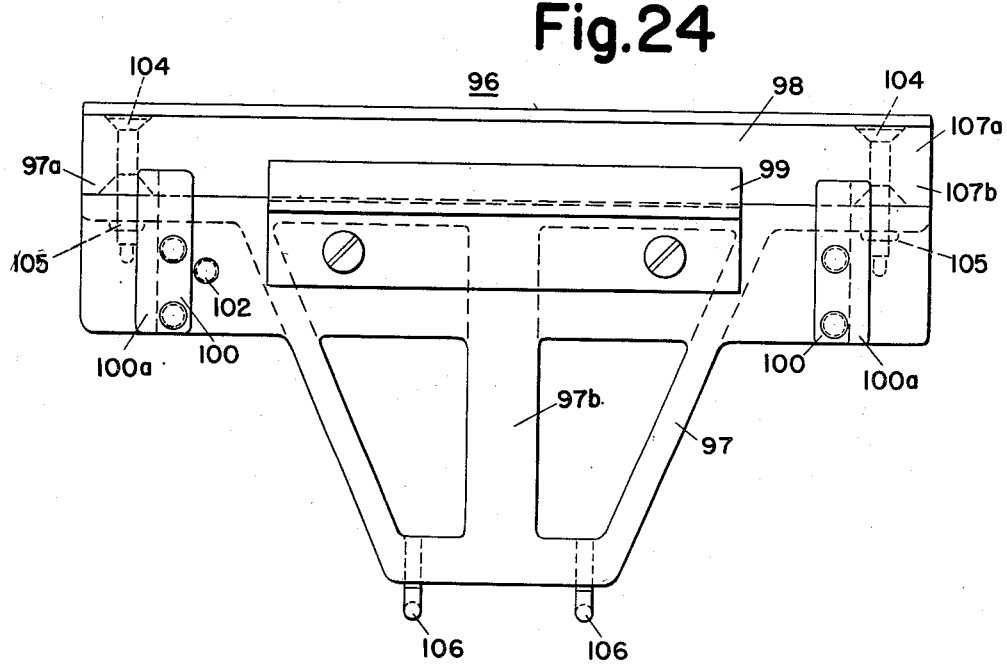
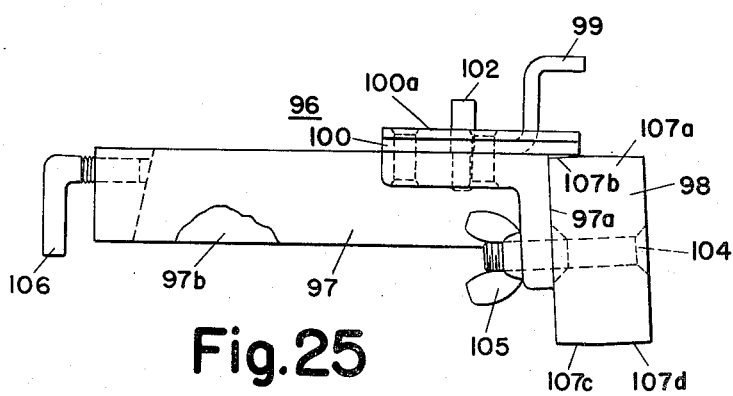

Patented Aug. 5, 1952

2,605,790

UNITED STATES PATENT OFFICE 2,605,790

ADJUSTABLE FRAME AND HINGE RECESS LOCATING JIG ASSEMBLY

Fred Schwarzer, Montgomery County, near Pottstown, Pa., assignor to Warren B. Zern, Montgomery County, near Pottstown, Pa.

Application July 26, 1949, Serial No. 106,836

21 Claims. (Cl. 144—27)

This invention relates to apparatus for clamping a jamb of a door frame to the door for cutting hinge seats and has for an object the provision of an apparatus which, with a minimum of adjustment and manipulation, automatically fixes templates in position for rapid and accurate routing or cutting of the hinge seats in the jamb and in the door.

In the earlier patent, No. 2,427,081, there is described an apparatus for cutting hinge seats in a jamb and in a door and that arrangement has proven reasonably successful in practice. However, much was left to be desired by way of simplification of procedure in getting the hinge jig assembly in proper adjustment for the cutting of the hinge seats. In practice it has been found that the use of templates alone will not speed production unless they can be fixed in position in less time than would be required for accurate measurement of the locations of the hinge seats.

In accordance with the present invention, the hinge jig assembly incorporates numerous features, all of which contribute to the provision of a "foolproof" hinge jig assembly in which the operator is more or less compelled to carry through the setting-up operation in the proper procedure, thus avoiding errors which would result in misadjustment of the templates.

In carrying out the present invention in one form thereof, the hinge jig assembly is provided with a frame member which may be adjustable as to length and which is adjusted to a length at least equal to that of a door. Template assemblies are adjustably secured to the frame. Each template assembly has a subframe, one section of which extends over the edge of the door and the other section of which engages a side of the door, thus providing for temporary suspension of the frame on the door. When so temporarily suspended, end-locators positioned one at each end of the frame are selectively operated so as to press an end of the door against a door-locating surface to fix the position of the frame lengthwise of the door. Located adjacent the end-locators are door-engaging clamps which are then actuated to clamp the frame in secure fixed relation with the door. The endwise location of the frame relative to the door is not only important from the standpoint of accurate location of each of the template assemblies but also for the location of the jamb relative to the door. For example, some clearance is ordinarily provided between the door and the frame, particularly at the upper and lower ends thereof. To provide such clearance, there is arranged a jamb-locating arm at each end of the frame movable into engagement with the jamb to locate its position relative to the frame and the door. More particularly, brackets extending outwardly from each end of the frame provide for the placement of the jamb thereon for the movement of a selected jamb-locating arm against the jamb to position it relative to the door. The arrangement is such that one end of the jamb extends slightly beyond the upper end of the door by an amount which will provide the necessary door clearance.

Each template assembly includes a support extending outwardly of the door and away from the frame for the pivotal support of clamping assemblies. There is a clamping assembly associated with each template assembly. Initially, the clamping assembly is rotated about its support to its elevated position where it is held during the insertion of the jamb or placement of the jamb on the brackets.

The clamping assembly itself is novel and cooperates with the other component parts of the assembly in a manner which will now be set forth. The clamping assembly is provided with a central pivot which permits rotation of the body portion thereof to a position at right angles to the axis of the support, and while at such right-angle position it may be rotated upwardly out of the way of the jamb. The clamping assembly includes a movable jaw for engaging the edge of the jamb, this jaw including an extension which cooperates with a recess to hold each clamping assembly in the upper elevated position. After location of the jamb on the supports, each clamping assembly is moved to the lowermost position and the body portion turned through 90° to bring one arm of a crank beneath the jamb which is then resting on its bracket. By means of an operating handle each crank is then rotated upwardly to engage the jamb to lift it against locating surfaces disposed below each template. These surfaces on the template are preferably formed integral with one section of the subframe thereof. When the jamb rests against the locating surfaces the slidable jaw is then actuated to press the jamb against the door. The slidable jaw will not be actuated until the jamb comes to rest in its elevated position against the locating surfaces. Since the action of the clamp for the jamb depends upon the frame and each template being held in fixed position, it will be seen that if one forgets to actuate the end-locators and the clamp at the end of the frame member, the clamp for the jamb will not properly function and there will be avoided any likelihood of an effort to cut hinge seats with the apparatus out of adjustment.

There are many other and further objects and advantages of the invention which will be set forth in the following description taken in conjunction with the accompanying drawings, in which:

Fig. 2 is also a view in perspective, and in this instance shows the hinge jig assembly as viewed from the opposite side and from the opposite end from the view in Fig. 1; the operator is shown in the process of inserting the jamb into the hinge jig assembly preparatory to clamping the jamb into position against the door;

Fig. 3 is an elevational view of the right-hand door end-locating assembly 19 of the hinge jig shown in Fig. 2;

Fig. 4 is a plan view of the door end-locating assembly of Fig. 3;

Fig. 5 is an elevation, partly in section, of the door end-locating assembly taken from the right of Fig. 3 with a part of the cam lever omitted;

Fig. 6 is a view in perspective of the end-locating assembly of Fig. 3 with the pressure shoe in a retracted position, the jamb-locating arm in its lowered position, together with a fractional portion of a jamb and a door, the latter being shown in phantom;

Fig. 7 is an enlarged fractional view of the right-hand end of the hinge jig assembly showing the respective positions of the door, the jamb, and one of the template assemblies with the clamp assembly for clamping the jamb into position against the door shown in its elevated position;

Fig. 8 is an enlarged end elevation of the jamb-locating arm with its jamb-locating surfaces engaging the edges of the dado of the jamb;

Figs. 9, 10 and 11 are detail views of the clamp assembly respectively illustrating the position of the various parts thereof when the clamp is in its initial, intermediate, and fully clamped position;

Fig. 9a is a fractional view of the jamb-engaging end of the clamp of Fig. 9 with the clamp shoe shown in its extended position;

Fig. 15 is a fractional plan view of the channel members of the right-hand half of the hinge jig frame and a handle associated therewith; the remaining portion of the hinge jig frame being shown in Fig. 15a;

Fig. 15a is a fractional plan view of the channel members of the left-hand half of the hinge jig frame with portions of the door end-locating assembly and a handle cut away;

Fig. 16 is a sectional view taken along the line 16—16 of Fig. 15;

Fig. 17 is a sectional view of the center channel section taken along the line 17—17 of Fig. 15a;

Fig. 18 is a sectional view of the left-end channel section for the hinge jig taken along lines 18—18 of Fig. 15a;

Fig. 21 is a sectional view taken along the line 21—21 of Fig. 20 with a router shown in position for cutting or routing out the hinge seats in a square-edge door and in the jamb;

Fig. 21a is a fractional view of Fig. 21 with a beveled-edge door and jamb in clamped position;

Fig. 22 is an exploded view of a locator block or template stop;

Fig. 22a is a section taken on the lines 22a—22a of Fig. 22b;

Fig. 22b is a front elevation of the block of Fig. 22a;

Fig. 23 is a perspective view of the block of Fig. 22 in reversed position on a flange of the channel frame;

Fig. 24 is a plan view of a clamping accessory or filler block assembly;

Fig. 25 is an elevation taken from the right of Fig. 24; and

Figure 1:
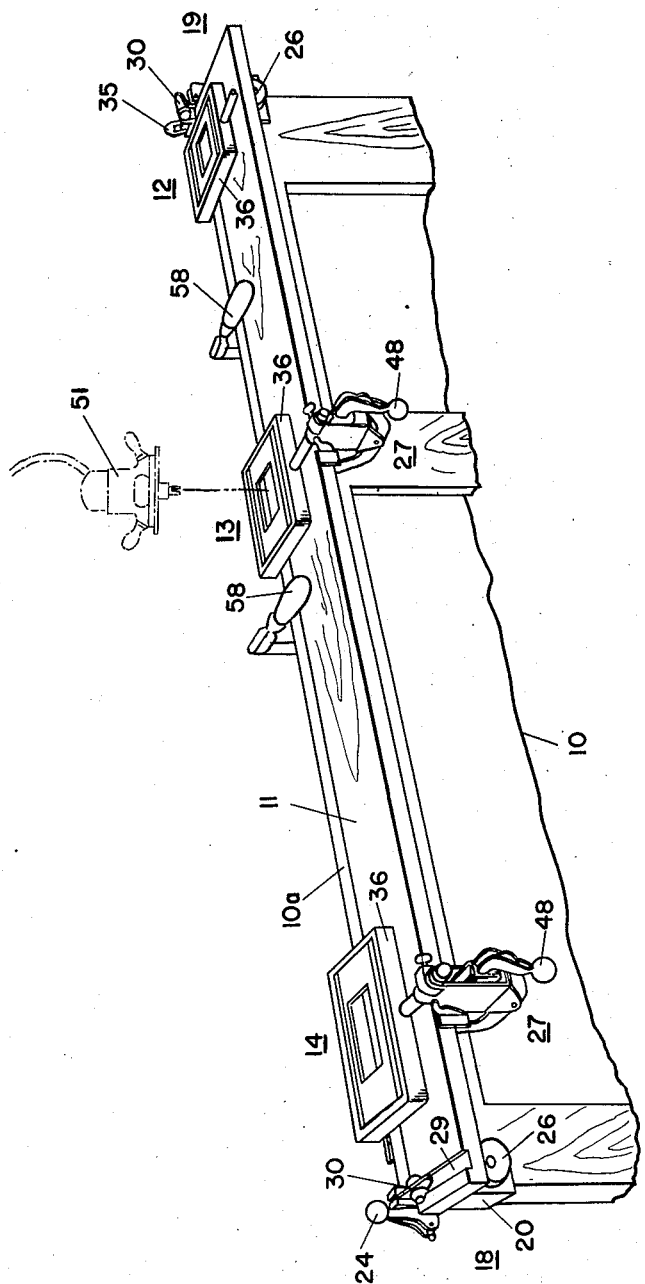
Fig. 1 is a perspective view of a door, the jamb and the hinge jig assembly with the parts thereof in position for the cutting of the hinge seats.

Referring to the drawings, in Fig. 1 the invention has been shown in one form as applied to a door 10 and a door jamb 11 which has been properly located with respect to the door preparatory to the cutting or routing out of the hinge seats on both the door and the door jamb as by the router 51. The door 10 is held with its hinge-receiving edge 10a in horizontal position by suitable means (not shown) such as clamps attached to the base of a work bench.

It will be observed in Fig. 1 that the template assemblies 12, 13 and 14 extend over the upper hinge-receiving edge 10a of the door and outwardly over the upper surface of the jamb 11. Clamping assemblies 27 are secured, one to each of the template assemblies 12—14, though the one for assembly 12 has been omitted in Fig. 1. The three clamping assemblies 27 cooperate together to hold the jamb 11 upwardly against lower jamb-locating surfaces on each section of the subframe of the template assemblies 12—14, and the clamp also serves to clamp the jamb 11 tightly against the hinge-receiving edge 10a. The hinge jig assembly as a whole is tightly secured to the door by rotation of clamping knobs 26 located at the respective ends of the frame, these knobs serving to actuate the clamps into gripping engagement with the door. It will also be observed in Fig. 1 that there is provided at the head end of the door a jamb-locating arm 30 to which is secured an abutment resting within the dado 29 of jamb 11 for accurate location of the jamb 11 lengthwise of the door. This lengthwise adjustment provides for the clearance at the head of the door and below the doorframe to insure freedom of the movement of the door to and from closed positions.

With the parts in the positions shown, it is only necessary to lower the router 51 into each template assembly quickly and accurately to form the hinge seat in both the jamb 11 and the upper edge 10a of the door. After the hinge seats have been routed or cut, the three of them taking less than about a minute, the apparatus may be quickly and readily removed from the door. The first operation is to lift the operating lever of the clamping assembly 27 by means of the knobs 48 to release each of the clamping assemblies. These assemblies 27 are then turned and lifted to the position shown in Fig. 2 by reason of constructional features later to be described in detail. The clamping knobs 26 are then loosened. With the clamping assemblies 27 in their elevated position, the jamb 11 may be removed and the jamb-locating arm 30 raised to its elevated position to correspond with the position of the arm 30 at the right-hand end of the jig assembly of Fig. 1. An operator, by grasping two conveniently located handles 58 and 59, may then bodily lift the frame including the template assemblies off of the door. The door is then removed and another door placed in position; that is, it is clamped to the work bench to hold the hinge-receiving edge in the horizontal position as shown in Fig. 1. The jig assembly as a whole is then lowered onto the door 10. Just prior to lowering of the assembly as a whole onto the door 10, the knob 24 of the end-locating assembly 19 is lifted to the elevated position to retract the shoe 21, Fig. 3. With the assembly as a whole relatively loosely mounted on the door, the knob 24 of the locator assembly 19 is moved to the position shown in Fig. 2. During this movement the pressure shoe 21, Fig. 3, moves outwardly against the door to pull the frame as a whole to the right of the door as viewed by the operator in Fig. 2, and to bring the locating surface 20a of the left-hand locator assembly 18 against the edge of the head end of the door.

The door end-locating assemblies 18, 19 are similar in construction, the only exception being that one is a right-hand assembly and the other is a left-hand assembly. Assembly 18 will be referred to as a left-hand assembly, it being to the left of the operator, and assembly 19 will be referred to as a right-hand assembly, it being to the right of the operator.

In Figs. 1 and 2 a left-hand door has been shown. Right-hand and left-hand door are terms which refer to the swing of the door and may be defined as follows: When facing a closed door so that it will open away from the observer, the position of the hinges relative to the observer, left or right, determines the swing of the door. In setting up the hinge jig assembly preparatory to cutting the hinge seats in the door and jamb there are two steps or rules to be followed. The first is that all the doors, whether left-hand or right-hand, are to be placed in the hinge jig assembly so that the locating may be done from the head end of the door. The head end of the door is that end which is commonly referred to as the top when the finished door is hung in its frame and is characterized in the conventional panel type door used in the home by the narrow cross frame member or rail as distinguished from the wide cross frame member or rail at the bottom of the door. The second step to be followed concerns the swing of the door; that is, whether the door is to be a left-hand or right-hand door. If the door is to be a left-hand door, as previously defined, the head end thereof will be located within the door end-locating assembly 18 to the left of the operator, Figs. 1 and 2, and if the door is to be a right-hand door the head end will be located within the door end-locating assembly 19 to the right of the operator. Thus, by following these two simple rules the operator is readily able to adapt the hinge jig assembly to either right-hand or left-hand doors.

THE END-LOCATORS

Each of the end-locating assemblies 18 and 19 is provided with a frame 20 which is connected, as by screws, to the corresponding end of the hinge jig frame. There extends through the frame 20, Figs. 3–7, of each of the door end-locating assemblies 18, 19 a locating pressure shoe 21 operated by a cam 22a of a cam lever 22 and driven by an operating cam link 23. The cam lever 22 is provided with a ball knob or handle 24. When the handle 24 of door end-locating assembly 19 is in its lowered position the pressure shoe 21 is thrust forward to its extended position by means of compression spring 25. With the hand 24 of the end-locating assembly elevated, as shown by broken lines in Fig. 3, the pressure shoe 21 is withdrawn to a position flush with, or slightly behind, the locating surface 20a of the end-locating frame 20. It has been shown in Fig. 6 in the withdrawn position.

In Fig. 2, knob 24 of end-locating assembly 19 is shown in its lowermost position, while the knob 24 of the assembly 18 is shown in its uppermost position. Accordingly, with the knobs so located and with the understanding of the end-locating assembly gained from a detailed consideration of Figs. 3–7, it will be seen that spring pressure is applied to the lower end of the door 10 through pressure shoe 21 of end-locating assembly 19, the reactive force against the end-locating assembly 19 being applied through the frame comprising channel members 15, 16, 17, Fig. 2, to move the hinge jig assembly toward the lower end of the door 10 until such movement is stopped by accurate location of the upper or head end of the door against the locating surface 20a (Figs. 3 and 6) of frame 20 of the end-locating assembly 18.

With the door now located as described, a hand knob 26 of each of the end-locating assemblies 18, 19 is turned to tighten the clamp member 26a, Figs. 3, 4 and 6, to hold the frame in fixed position on the door. The template assemblies 12–14 are then again in correct position for the routing of the hinge seats. The next step is the insertion of the door jamb 11.

THE JAMB-LOCATOR AND CLAMPING ASSEMBLIES

Referring to Fig. 2, it will be remembered that the clamping assemblies 27 carried by each of the template assemblies 12, 14, were rotated to their elevated positions and out of the way of the movement of the door jamb 11 into its preliminary position onto the brackets 28 extending from each of the end-locating assemblies 18, 19. Each bracket 28, Figs. 3 and 5, is positioned in a socket provided therefor in the frame 20 of the corresponding end-locating assembly and is adjustable as to height to accommodate jambs of different thickness. A socket head cap screw 28a is provided to lock each of the brackets 28 in the desired position. With the jamb 11 against the door and on the brackets 28, it may be moved lengthwise of the door 10 to locate it relative thereto; and its location is automatically accomplished if of the dado type, best seen in Fig. 1. The dado 29 is located at the upper or top end of the door. The end-locating assembly 18 carries the jamb-locating arm 30 which is biased downwardly by a tension spring, similar to the spring 31 of end-locating assembly 19 shown in Fig. 5. The arm 30, by means of pin or screw 33, carries a cylindrical member or jamb-stop 32, similar to that shown in Fig. 3, one side thereof having a flat face in the direction of the lower end of the door, and on the opposite side of the arm and on the same pin or screw 33 is a conical shaped threaded member 34. The arm 30 is pivoted by the pin 30a which extends between bifurcated ends 30b of the subframe of the end-locating assembly 18, Fig. 1, and as may better be seen in connection with assembly 19 in Fig. 6.

In order to rotate the arm 30 about the pivot pin 30a there is provided a lever 35 having downturned extensions 35a which help pivotally to mount the lever 35 by preventing sidewise movement when it is rotated. The lever itself is provided with a cross member 35b, Figs. 4 and 5, which extends beneath the arm 30 and has extensions 35c projecting outwardly from the downturned members 35a. These extensions 35c serve pivotally to mount the lever 35 on the upper surface of the frame 20. Thus, when the lever 35 is rotated in a counterclockwise direction, as viewed in Fig. 5, it will be seen that the cross member 35b will engage the arm 30 to move it in a clockwise direction about its pivot 30a and against the bias of the spring 31. Since the cross member 35b has a narrow flat surface the pressure exerted upon it by the spring 31 and through the arm 30 will hold the assembly in the releasing position as shown at the left-hand end of Fig. 2. While lever 35, Figs. 4 and 5, is held in position on the frame 20 only by means of the arm 30 under the bias of the spring 31, nevertheless, it cannot be accidently displaced from its position by continued movement of the arm 30 in a clockwise direction, Fig. 5, as the hook 31a which connects the spring 31 with the arm 30 will strike the frame 20 and thereby eliminate any further clockwise movement of the arm.

The arm 30 is positioned between the upright bifurcated extensions 20b of the frame 20 as may best be seen in Fig. 4. The extensions 20b accurately locate the arm 30 perpendicular to the longitudinal axis of the hinge jig assembly to insure accurate location of the jamb dado with the top end of the door. The extensions 20b also provide additional lateral support for the locating arm 30 when the jamb is moved lengthwise of the door in order properly to locate the jamb stop on the locating arm 30, Fig. 1, firmly against an edge of the dado on the jamb.

The end-locating assembly 19 also is provided with a jamb-locator similar to the jamb-locator of end-locating assembly 18 described above and is used in locating a jamb in relation to a right-hand door as shown in Fig. 6. In that enlarged view the positions of the parts are clearly illustrated, and it will be observed that the edge 29a of the dado 29 engaging the cylindrical member 32 is spaced upwardly from, or to the right of, the top of the door 10 a slight amount. This spacing provides clearance for the door 10 for freedom of movement in and out of the door frame after final mounting of the door.

It will be seen, Fig. 2, that the arm 30 of the jamb-locator at the lower end of the door is in an elevated or inactive position for the left-hand door 10. It thus becomes apparent that when a right-hand door is being prepared for hinge seat cutting as shown in Figs. 6 and 7, the head end of the door is located from end-locating assembly 19 and the jamb-locator thereof is lowered to its active position, shown in enlarged view Fig. 8, for engaging the edges of the dado 29.

As already stated, when a left-hand door is being prepared for hinge seat cutting the head end of the door is located from end-locating assembly 18 and the jamb-locator thereof engages the dado in the same manner as shown in Fig. 8. In all cases, the jamb-locator on the end-locating assembly at the bottom of the door, whether left-hand or right-hand, is raised to its elevated or inactive position.

With the jamb 11 located in its final lengthwise position relative to the door 10, the next step is to clamp it in position preparatory to the cutting or routing operation of the hinge seats. This is accomplished by means of the clamp assembly 27 of each of the template assemblies 12–14. Each clamp assembly 27 is characterized by a double action; that is, one which first presses the jamb upwardly against the locating surfaces on the under side of one section of the subframe of the template assembly, and then firmly against the door 10. In this manner there is avoided any space between the door and the jamb during the routing operation and there is assurance there will be no surface breakage as the routing tool moves from one to the other.

It will be observed with the clamp assemblies 27 in their elevated positions, Fig. 2, the right-hand end of the hinge jig assembly being shown in the enlarged view, Fig. 7, a latch 37, Fig. 7, secured to the horizontal jaw 38, Figs. 9 and 10, engages a locking recess 39a in the locked collar member 39 to hold the clamp assembly 27 in its elevated position. Thus, the horizontal jaw or clamping member 38 and its spring 40, Figs. 9–12, form a cooperative part of the latching mechanism to hold the clamp assembly 27 in the elevated positions shown in Fig. 7. The jaw 38 and spring 40, Figs. 9–12, are mounted for horizontal movement within the central portion of the body member or frame 41, a sectional view of which is shown in Fig. 13. One end of the spring 40 is connected to a pin 41a which extends between the side walls of the body member 41. The opposite end of the spring 40 is connected to a pin 38a of the jaw 38 for movement therewith and relative to body member 41. The curved surfaces on the latch tip 37a, Fig. 9, and the collar member 39 provide for a camming action for release and application of the latch in rotating the clamp from its upper to its lower position, and vice versa. As may be seen in Fig. 7, each clamp assembly 27 is pivotally mounted by means of body member 41 on an arm 42 which extends horizontally from the frame 36 of each of the template assemblies. Locked collar member 39 is provided with a thumbscrew 43 for locking the clamp assembly 27 into position on the arm 42 and in predetermined spaced relation from the template frame 36. The rod or arm 32 is provided with a flat surface on one side thereof for engagement with the flat end of the thumbscrew 43 to lock the collar member 39 in a fixed position.

It will be noted, Figs. 9–12, the lower jamb-clamping member or lever 44 is pivotally mounted intermediate its ends by means of a pan 44a to a bracket 45 which is in turn pivotally connected to body member 41 by a pin or screw 45a. The bias of a spring 46, Figs. 9–11 and 14, biases lever 44 for counterclockwise rotation as viewed in Figs. 9–11. An actuating arm 47 having a handle 48 is pivotally carried by clamping lever 44 and is connected near the right extremity thereof by means of a pin 47a. As shown in Fig. 7, the bracket 45 has been rotated through 90° with respect to body member 41, thus placing the axis of clamping member 44 in a plane parallel to the length of the door 10. Thus, when the clamp assembly 27 is moved to its lowered position by rotating body member 41 through 180°, there will be no interferences between the template frame 26 and the clamping member 44.

Figure 11:
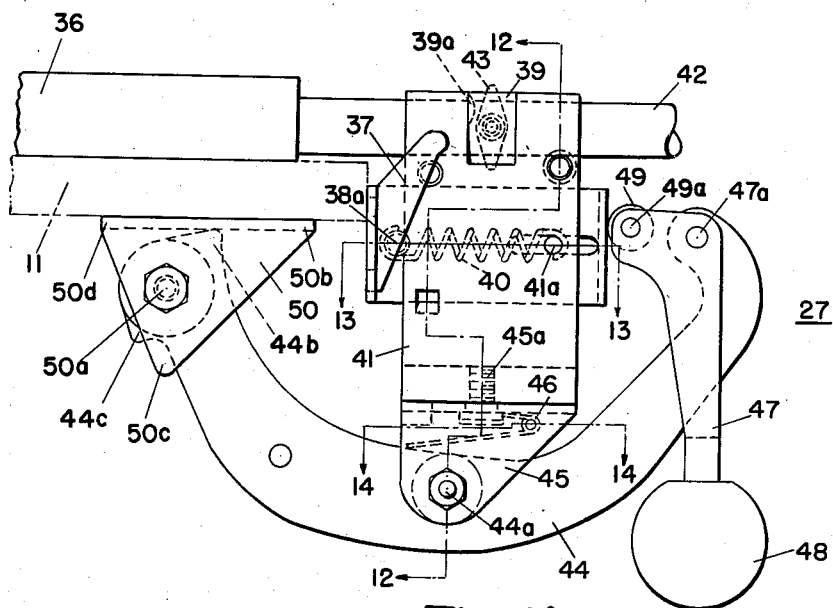
Figures 12, 13, 14:
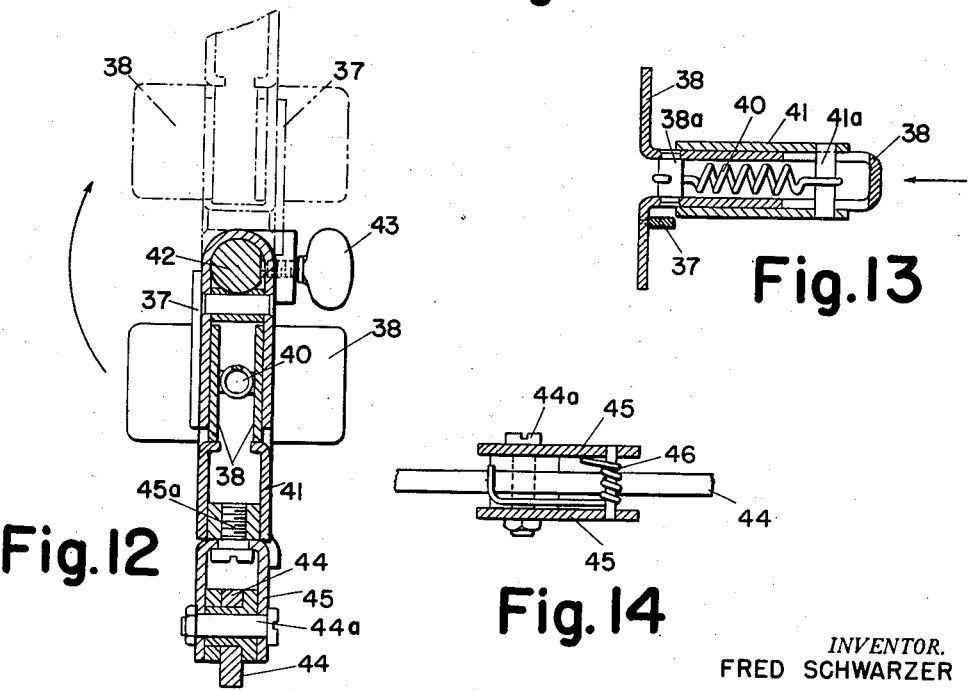
Fig. 12 is a sectional view of the clamping assembly taken along the line 12—12 of Fig. 11, with a fractional portion in phantom shown after rotation to an elevated and inverted position.
Fig. 13 is a sectional view taken along the line 13—13 of Fig. 11.
Fig. 14 is a sectional view taken along the line 14—14 of Fig. 11.

After the clamp assembly 27 has been rotated from the elevated position shown in Fig. 7 to the lower position of Figs. 9–11, the lower jamb-clamping member 44, the handle 48, and the actuating arm 47, all carried by the pivoted bracket 45, are rotated through 90° to bring the actuating arm 47, which carries a cam roller 49, into alignment with the horizontal jaw 38 and at the same time, bring the lower jamb-clamping member 44 beneath the jamb 11. With the parts so positioned, Fig. 9, the handle 48 is rotated downwardly. The roller 49, pivotally mounted on pin 49a, engages the rear end of the horizontal jaw 38 and temporarily serves as a fixed fulcrum about which the handle 48 rotates. This rotation moves the right-hand arm of the crank or lower clamping member 44 in a clockwise direction against the bias of spring 46, elevating the left-hand arm thereof upon which is mounted a clamping foot 50, and lifting or applying an upward force against the door jamb 11. The clamping foot 50 is pivotally connected to the crank arm 44 by means of a pin 50a, the purpose of which will be hereinafter described.

As the handle 48 is rotated further, the horizontal jaw 38 is moved to the left toward and against the door jamb 11 against the bias of the releasing spring 40. This occurs when the jamb comes to rest against the under surface of the template frame. This movement is continued until the axis of the roller 49 is moved above the axis of the pivot 47a, so that the bias of the spring 40 then tends to continue the movement of the member 47 in the same direction and thus forms a self-locking arrangement to hold the clamp in the clamping position. The lever 47 is bifurcated, the outer solid end thereof engaging the clamping lever 44 to bring the parts to standstill. As aforementioned, all of the clamps 27 are identical and they are operated in a similar fashion.

With all the clamps 27 positioned as described and as shown in Fig. 1, the jamb 11 is properly located with respect to the door 10, and the router 51 may again be used to cut or rout out the hinge seat. The router itself is of conventional design, Fig. 21, and comprises a bit 52 extending through a guide plate 53 which is lowered upon the upper flat surface of the template assembly. It will be observed that the router bit 52 extends through a stationary guide bushing 54 which engages the edges of the opening in the template 55 accurately to locate the router 51 during its movement through the open area of the template. With the router 51 lowered into position, the flat surface of its guide plate 53 is pressed against the upper flat surface of the template 55 and the template frame 36. This insures that the bit 52 extends at right angles to the face of the template 55. The router 51 is then briskly moved about the edges of the opening in the template 55, and it is then moved back and forth until all of the wood in the jamb and the door within that area has been removed to a predetermined depth to form the completed hinge seats 56, 57, Fig. 21. The size of opening in the template 55 will be proportionately larger than the size of the hinge in order to allow for the thickness of the guide bushing 54. In determining the depth of setting for the router bit 52, allowance is made for the depth of the template assembly in addition to the thickness of the hinge being installed. The hinge seats themselves are formed parallel to the surface of template 55 which is located at an angle slightly greater than a right angle with respect to the sides of the door, the purpose thereof to be hereinafter explained.

After the hinge seats have been completed, it is only necessary to release the clamps 27 by raising the handles 48; move them to their position shown in Fig. 2 and release the two end clamps of the door end-locating assemblies 18, 19 by the hand knobs 26. The jamb 11 is then removed and the operator grasps the handles 58, 59 extending from the channel sections 15, 16, 17 of the jig frame and lifts the hinge assembly from the door. The door 10, insofar as the hinges are concerned, is ready to be hung. The operation is speedy and accurate, and in practice hinge seats may be cut in doors and jambs in a very short time, for example, the entire setting-up and routing operations may be completed in two minutes.

THE VERSATILITY OF THE HINGE JIG ASSEMBLY

The versatility of the hinge jig assembly is adequate also to take care of doors and jambs of widely differing dimensions. The hinge jig assembly is adaptable for use on doors of different length as well as different thickness. It is also adaptable for use on jambs of different width and thickness. Its versatility is adequate also to take care of doors, the hinge-receiving edges of which may be either beveled or square, and a provision has been made for adapting the jig for the cutting of hinge seats in a door alone, when the door is to be hung from a metal frame. The necessary adjustments and the features required for such versatility will now be described.

A. *The hinge jig frame*

As has already been stated, doors in general come with predetermined dimensions. For example, the lengths ordinarily change by steps of two inches each. Accordingly, the connecting channel or frame of the hinge jig assembly is made up of three channel-shaped sections 15, 16, 17, Fig. 2, which may be adjusted in relation to each other in order to vary the total length of the hinge jig. The center channel section 16 on which the two end sections 15 and 17 slide, Figs. 15–18, is provided with a series of locating holes or openings 60a–60d and 61a–61d, Figs. 15, 15a, spaced one-inch apart at the respective ends 16a, 16b of the center channel 16. The shanks 62 and 63 of handles 58 and 59 have been shown inserted in the openings 60d and 61d in Figs. 15 and 15a.

If it be assumed that the door 10 which has already been described in detail is a seven-foot door and that it is now desired to cut the hinge recesses for a six-foot, ten-inch door, all that is necessary is to rotate the two handles 58, 59 at the center of the assembly until the threaded end of the shanks 62, 63 are unthreaded from the inner threaded openings in the bottom lugs 64 and 65, respectively carried by the bottom flanges of the end channels 15 and 17, Figs. 2 and 16. Lugs 66 and 67 are carried by the upper flanges of channels 15 and 17, and the openings therein are aligned with the openings in the corresponding bottom lugs 64 and 65. The openings in the upper lugs 66 and 67 are not threaded and are of sufficiently large diameter to permit the threaded ends of the corresponding shanks 62 and 63 to pass freely therethrough. The handle 58 and the shank 62 are then removed and the end channel 15 slid relative to the center channel 16 to the next opening 60c located one inch therefrom. The shank 62 is inserted into the newly aligned openings and the threaded end returned into threaded engagement with the threaded opening in the cooperating lug 64. The upper end of the stud or shank 62 is provided with a shoulder 62a, Fig. 16, which engages the surface of the upper lug 66 attached to the upper flange of end channel 15. By rotating the handle 58 in a direction to tighten the stud 62, the upper and lower flanges of the end channel 15 are pressed toward each other and against the corresponding flanges of the right-hand extension 16a of the central channel 16, Figs. 15 and 16, locking them together. Similarly, the other handle 59 is removed, the end channel 17 is slid along the left-hand extension 16b, Fig. 15a, to the adjacent opening 61c one inch away for alignment of the openings, and the operation repeated. Since the handles 58 and 59 are identical in construction, only the handle 58 has been shown in detail in Fig. 16. After the simple foregoing adjustments, the hinge jig assembly is then in readiness for operation on doors of lengths of six feet, ten inches, the remaining operations then being repeated to rout out the hinge seats.

For adjustments intermediate the standard sizes, it will be observed, Fig. 16, that each of the lugs 64 and 66 projects outwardly from the channel 15, the lower lug 64 being provided with an outer threaded opening 64b and the upper lug 66 being provided with an outer unthreaded opening 66b of sufficient size to receive the intermediate diameter of the shank 62. A similar arrangement is provided by lugs 65 and 67, Fig. 2, on channel 17. The end channels 15 and 17 may be adjusted to any desired position with respect to the corresponding extensions 16a and 16b of the center channel 16 by rotating the handles 58 and 59 in a direction to tighten the cooperating threaded members, and the resulting clamping or squeezing action will lock the channel sections securely together. In this manner the hinge jig frame may be adjusted to any desired length to accommodate doors of other than standard lengths. Scales are unnecessary for this adjustment since the distance between the outer or end channels 15 and 17 and the center channel 16 may be readily measured for accurate positioning for the intermediate non-standard size doors. The purpose of the scales which do appear on the surface of the upper flange of the channel sections 15, 16 and 17 will be hereinafter described.

B. *The template assemblies*

For heavier doors, it is frequently desirable to use three hinges. Accordingly, it will be seen, Fig. 2, that two template blocks 68a and 68b have been provided in the intermediate position on the central channel 16 for cooperation with a third template assembly.

Figure 20:
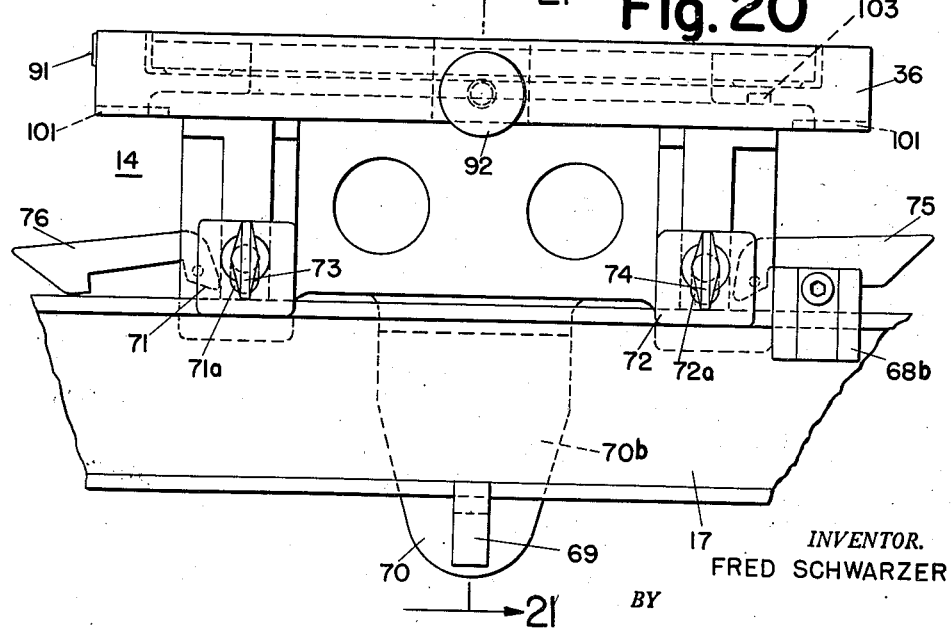
Fig. 20 is an elevation of a template assembly mounted in position on a channel of the frame, part of the latter being cut away.

As shown in Fig. 1 a third template assembly 13, together with its clamp 27, can readily be located in the central position on channel 16. Each template assembly is similar in construction and is provided with a hook-shaped end 69, Figs. 2, 20 and 21, arranged to receive the channel between it and the downwardly extending section 70 of the frame 36, Figs. 20 and 21. When so located, the clamping members 71 and 72, Figs. 2 and 20, overlap the upper edge of the channel. It will be observed that the clamping members 71 and 72, Fig. 20, are provided with slots 71a and 72a so that they may be lifted above the upper edge of the channel for easy mounting and removal of the template assembly 14 as a whole. When they are dropped to their lower positions, they are tightened against the channel by means of thumb screws 73 and 74. Before tightening the thumb screws, the template assembly as a whole will be slid toward the top end of the door until engaging the positioning block 68b, Figs. 20 and 2. During this movement the hook or latch 75 rides over the top of the block 68b and drops into position on the opposite side to anchor the template assembly in place. A similar latch or hook 76 is provided for engagement with a positioning block 68a when the top of the door is located at the opposite end of the hinge jig assembly. This is a desirable safety factor to prevent movement of the template assembly in the event the thumb screws 73 and 74 should become loosened at any time during the set-up and routing operations.

C. *The locator blocks*

The locator blocks 68a, 68b themselves also provide great flexibility in adjustment of hinge seat locations. Each of the channel sections 15, 16 and 17 is provided with a pair of locator or channel blocks 68a, 68b, Fig. 2, and locating openings 77a, 77b therefor, Figs. 15 and 15a. The channel blocks 68a are used for locating the template assemblies 12, 13 and 14 when a routing operation is to be performed on a right-hand door. Similarly, locator blocks 68b are used during a routing operation for a left-hand door. Each of the locator blocks 68a and 68b are identical in construction. As best shown in Figs. 22 and 22a, when the locator block 68b is positioned over a locating hole 77b in the channel 17 preparatory to locating template assembly 14 for the routing of a hinge seat in a standard location, a knurled head 78 is rotated to lower the end of the threaded stud 79 into the opening 77b, Fig. 22, to fix in definite position the locating block 68b with respect to channel 17. As the knurled head 78 is rotated, the unthreaded end 79a of the stud 79 enters the hole 77b in the channel 17 and the knurled head 78 descends to a position flush with, or slightly below, the upper face of the block body 86. Unless the knurled head 78 has been so lowered, the cooperating hook 75, Fig. 20, on the template assembly 14 cannot be moved over the block 68b for locking engagement behind it. This provides a safety feature to insure accuracy of location of the blocks and provides an immediate indication if an effort is made to use the hinge jig assembly with the blocks out of their proper locations.

If the doors are to have their hinges mounted in standard locations, for example, if the top of the upper hinge is to be five inches below the top of the door and the bottom of the lower hinge is to be ten inches above the bottom of the door with the middle hinge located mid-way between, it is to be noted that even if the frame be adjusted for doors of different lengths, the locator blocks will still be in the proper positions for the standard locations of the hinges. The reason for this is, as will be remembered, in adjusting the length of the frame to doors of a different size each of the end sections 15 and 17 are moved the same distance with respect to their adjacent ends of the center section or channel 16. Thus, the locator blocks on channels 15 and 17 for the upper and lower locations of the hinges will remain in a fixed position relative to their corresponding ends of the frame, and the locator blocks on the center channel 16 will continue to be centrally spaced with respect to them. Since the locator blocks are positively secured in their standard locations on the channels by means of a threaded pin inserted through an opening therein, there is no opportunity for the position of the locator blocks to be accidentally disturbed during the adjustment of the length of the frame.

For doors which require location of the hinges other than in standard locations, the positioning blocks 68a, 68b provide the requisite flexibility. In such cases, the knurled heads 78, Figs. 22, 22a and 22b, are rotated to bring the unthreaded ends 79a in spaced relation with the inner slotted areas of the blocks which receive the upper flange of the channel sections. The blocks 68a, 68b are removed and turned to the inverted position. In such position, as shown by blocks 68b in Fig. 23, it will be observed that the inclined end 80 of the pivoted center member 81 has an arrow 82 which registers with a scale 83b stamped on the upper flange of the channel 17. Each of the end channel sections 15 and 17 is provided with two scales 83a, 83b and 84b, 84a respectively for use with the corresponding channel blocks 68a and 68b. The scales 83a and 83b are laid out with reference to the right-hand end of the hinge jig frame, and the scales 84b and 84a are each laid out with reference to the left-hand end of the hinge jig frame. Scales 83a and 84b are similar, as are scales 83b and 84a. For example, when adjusting the hinge jig assembly for a left-hand door it will be remembered that the locating of the template assemblies is performed with reference to the channel or locating blocks 68b. Thus, if locating block 68b of channel 17 is moved to alignment of arrow 82 with a position on the scale 84b reading six inches, Fig. 23, the template assembly 14, Fig. 2, will then be located with reference to the positioning block 68b at location "6," a position such that the upper end of the hinge with reference to the upper end of the door will be exactly six inches below the top surface thereof. The locating block 68b is tightened and locked in position by a socket head cap screw 85 threaded into the hinge clamping member 81 of the positioning block 68b, Fig. 22a. By tightening the screw 85 the end thereof will move against the body 86 of the block 68b thus rotating the clamping member 81 which, it will be observed, is a crank arm pivoted at pin 87. The action is positive and provides adequate friction to prevent loosening thereof even though the template assembly is moved with great force against it.

Similarly, with respect to the channel 15 at the right-hand end of the hinge jig, template assembly 12, Fig. 2, will be moved against locating block 68b which is positioned with respect to a scale 83b by setting the arrow of the block 68b opposite an index number of scale 83b. The bottom end of the hinge with reference to the bottom end of the door will be the same number of inches above the bottom surface thereof as the number indicated by the arrow on the scale 83b. The locating block 68b is tightened and locked in position in a manner as previously described.

The center channel section 16, Fig. 2, is also provided with a pair of scales 88a, 88b. The scale 88a, Fig. 15, is laid out with reference to the right-hand end of the hinge jig assembly and the scale 88b, Fig. 15a, is laid out with reference to the left-hand end thereof. When cutting hinge seats for a right-hand door the template assembly 13, Fig. 1, will be located with respect to channel block 68a which is provided on scale 88a, Fig. 2. Similarly, when locating the template assembly 13 with respect to a left-hand door, it will be positioned against the channel block 68b which cooperates with scale 88b of channel 16.

D. Doors of different thickness

Since it is not uncommon to have doors of different thickness and, as is quite often the case, to have them used on the same job, the hinge jig assembly is provided with the requisite flexibility to accommodate the variations in thickness.

Figure 19:
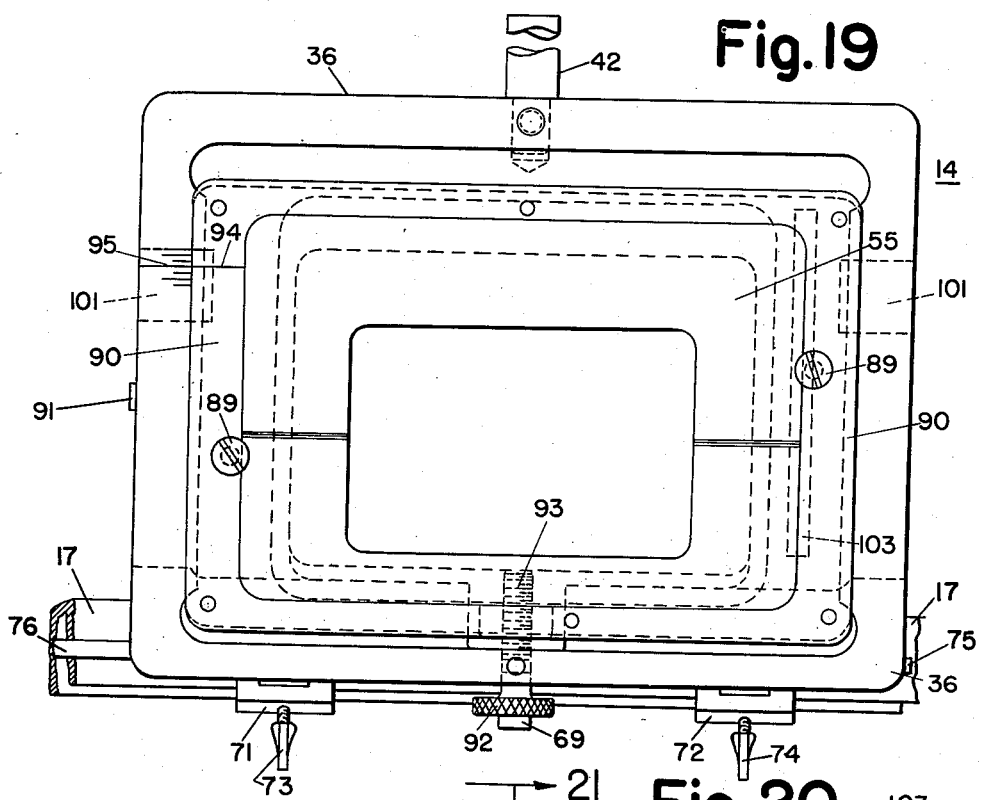
Fig. 19 is a plan view of a template assembly for the hinge jig.

It will be assumed that the doors, the operations on which have already been described, have a thickness of one and three-eighths inches. If doors of the same length be used but of greater thickness, for example, one and three-quarter inches, it is only necessary to remove the two counter-sunk screws 89, 89, Fig. 19, extending into the template holder or slide 90 for removal of the template 55 itself, and for the insertion of a different template with an opening designed for a larger size hinge which it is desired to use on the heavier and thicker door. This arrangement has the advantage that doors of different dimensions mounted with hinges of different sizes can be fitted with hinge seats with a minimum delay for the one series of doors of one thickness and another series of doors of a different thickness. In the event that a few doors of other than standard thickness, and hinges of other than standard sizes are to be used, the template slide 90 may be released by loosening the socket head cap screw 91 and by rotating the knurled knob 92 of screw 93 to the front of the template frame 36, as viewed in Figs. 19 and 20. This rotation, by reason of the threaded engagement of the inner end of the screw 93, with the template holder 90, Fig. 21, will slide the template holder 90 to any desired position which is readily predetermined by reason of an index line 94, Fig. 19, on the template holder or slide 90 registering with the scale 95 provided on the frame 36.

E. Jambs of different width

The jambs themselves may frequently vary in width to correspond with doors of different thickness. As far as the hinge template 55 is concerned, Fig. 21, such variations do not make any difference and no adjustment of the template slide 90 is necessary. However, the operation of the clamping assembly 27 is modified in accordance with the width of the jamb 11.

In Fig. 9 it will be observed that the end of the lower clamping arm 44 is provided with a triangular shaped member or foot 50 pivoted to it by means of a pin or screw 50a and extending in a direction toward the jaw 38. It will further be observed that the assembly 27 as a whole is slidable on a support or stud 42 extending outwardly from the frame 36 of the template assembly with a thumb screw 43 extending into a central collar 39 to clamp the assembly 27 in any desired position along the flat face of stud 42. The particular position in which it is clamped is such that the horizontal jaw 38 is just back of the jamb 11, for example, about one-eighth inch. The exact position is readily determined in operating the clamp. If it is too close, the clamp arm-operating handle 48 cannot readily move the actuating arm 47 over center, in which case the clamp assembly 27 is then spaced a slightly greater distance away from the edge of the door jamb 11.

The triangular shaped member or foot 50, Fig. 9, may be pivoted in a counterclockwise direction about pin 50a to an extended position, Fig. 9a, thus in effect to increase the overall length of the clamping arm 44 to accommodate wider jambs. If the door jamb 11 is narrow, so narrow that in order to adjust the clamp to the jamb, as described above, the end of the triangular shaped member 50 engages the door when carried in its extended position by the lower clamping arm 44, Fig. 9a, the lower clamping arm 44 is then swung again to one side and the triangular member 50 rotated about its pivotal axis to bring it into the shortened position shown in Fig. 9. By thus providing a pivotal point 50a intermediate one side of the triangular member 50, the end of the clamping member 44 can be lengthened or shortened as desired.

It will be noted, Fig. 2, that only one of the three edge-surfaces of the foot 50 is solid. As shown in Fig. 9, when the foot 50 is rotated to its shortened position for jambs of narrow width, the solid edge of the foot 50 rests against the projection 44b on the clamping member or arm 44. When the foot 50 is rotated to the position shown in Fig. 9a, the solid edge of the foot 50 will rest upon the projection or stop 44c on the clamping member 44.

It is further to be observed from Fig. 9a, when the triangular member 50 is in the position for maximum length of the lower clamping member 44, the outer end 50b thereof is disposed at a position higher than the end 50c adjacent the pivot point 50a. This is done for the reason that as the lower clamping member 44 rises during the clamping movement, the action is such as to lift the edge of the jamb adjacent the door to prevent binding and to insure that the jamb may be easily moved up to and against the locating surface on the bottom edge of the frame 36 of the template assembly. If the leading end 50b of the foot 50 were lower than the opposite end 50c, it has been found with a wide jamb there is a tendency for the jamb to press against the door and not to be moved upwardly into registered position with the template frame 36.

When the triangular member 50 is moved to its shortened position, Fig. 9, the leading end 50d of the triangular member 50 then is lower than the rearward end 50b. For the narrower jamb, the binding of the edges against the door has not been of any consequence. The latter inclination described has been found desirable in order to insure that the narrower jambs will be clamped in position solidly against locating surfaces on the bottom of the template frame 36 and in avoidance of angular positioning thereof, which might result had the aforesaid inclination not been provided. In other words, the inclination is such that in the clamped position the triangular member 50 extends parallel to the face of the template 55.

F. *Square-edge doors and beveled-edge doors*

As previously mentioned, the template 55 in frame 36 is located at slightly greater than right angles to the sides of the door, the angle being approximately 93½°, the purpose of which will now be described. It is common practice today to provide wooden doors either with their hinge-receiving edges square with the faces of the door, or at an inclined angle thereto. It will first be assumed that in the door of Fig. 1, the edges were square with the faces. With a hinge-receiving edge 10a square with the face, it will be observed, Fig. 21, that the hinge edge of the door rests within and against the flat faces 36a cut along the lower edges of the template frame 36 and at opposite ends thereof. These straight locating surfaces 36a are at right angles to the locating surface 70a of the door-engaging section 70 of the frame 36. Since the surfaces 36a of the horizontal part of the frame 36 are nearer the upper surface of the template 55 at one edge than the other, it will be seen that the router 51 will cut hinge seats which are slightly deeper along that edge than along the opposite edge. The finished hinge seat 57 tapers at an angle of approximately 3½° from the open end of the hinge seat to the rear. The taper is provided to prevent the door from being "hinge-bound," and provides the necessary clearance in the event the screws which are used in the hinge should not accurately seat in the beveled holes provided therefor, this being a circumstance which frequently arises when the screws are inserted at an angle with respect to the holes.

An important feature of the locating surfaces for the hinge-receiving edge of the door resides in the fact that in the region 36b to the left of the portion 36a engaged by the square door the angle is changed and the depth is less. By providing this double arrangement on the locating surface, the template assembly is made uniform both for doors with square edges on the hinge seat and for doors with inclined edges on the hinge seat. Where the door has an inclined edge as shown in Fig. 21a, and where the bevel is illustrated as approximately 3½°, it will be seen that the edge adjacent the open end of the hinge recess engages the surface 36b and thus locates the template 55 for a hinge seat 57a which is parallel with the inclned edge of the door. Thus, the hinge jig assembly may be used interchangeably and without further adjustment on doors of the two different types, and yet when the hinges are located in their respective hinge seats there will be adequate clearance between the faces of the hinge when the door and, therefore, the hinges are in the closed position.

G. *The clamping accessory*

Frequently the door frames are made of steel with hinges welded thereto. Thus, there is no longer any need for routing a hinge seat in the door jamb. In accordance with the present invention, the assembly is readily adapted for routing hinge seats in the doors alone, an accessory being provided which performs a plurality of functions. The clamping accessory or filler-block assembly 96, Figs. 24 and 25, comprises a body member 97 which not only carries a block of wood 98 to take the place of the door jamb in clamping relation against the door to prevent splitting of the edges during the routing of the hinge seat, but also includes a guiding element 99 extending into registration with the template 55 and forming a guiding edge for the router 51, Fig. 26. The guiding element 99 serves to decrease the effective area of the opening in the template 55 so that the same template may be used for routing seats in a door alone, Fig. 26, as was used in the routing operation on the door and jamb together, Fig. 21. The filler-block assembly 96 is provided with two guide plates 100, 100 undercut at their outer edges 100a to receive ways 101, 101, Figs. 19 and 20, secured to the underside of the template frame 36 for sliding relation therewith. In order to center the filler-block assembly 96 within the template frame 36, a pin 102, Figs. 24 and 25, extends from the body member 97 for sliding engagement within a slot 103, Fig. 19, in the bottom of the frame 36 of the template holder, thus preventing sidewise movement of the filler-block assembly 96 during clamping movement under the control of the clamp handle 43.

The block of wood 98 is attached to the forward face 97a of body member 97, Figs. 24 and 25, by means of two countersunk screws 104, 104 and thumb nuts 105, 105. It will be noted that the plane of the forward face 97a of body member 97 intersects the plane of the upper surface thereof slightly more than right angles, i. e., approximately 93½°. It will be remembered that the downwardly extending section 70 of the template frame against which the door is located also makes a 93½° angle with the horizontal section of the template frame 36, Fig. 26. Thus, when block 98 is secured to the forward face 97a of body member 97, it will lie in a plane parallel to the surface of the door, thereby permitting it to be firmly clamped against the surface thereof upon operation of clamp handle 43 in a closing direction.

Figure 26:
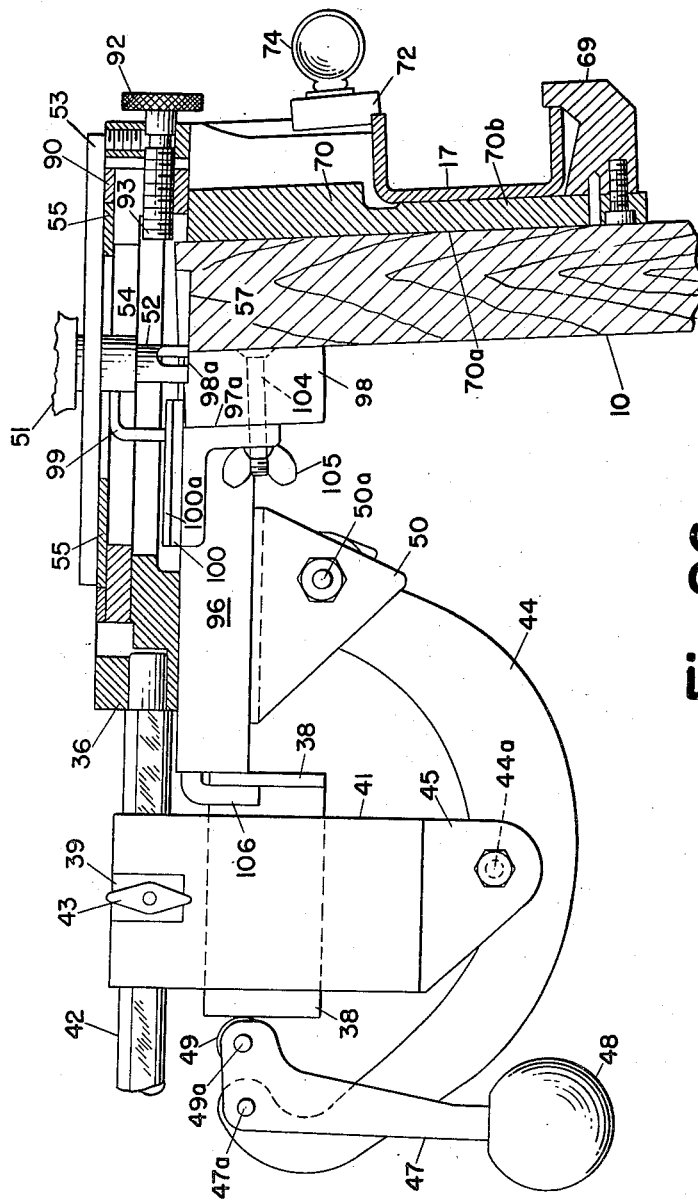
Fig. 26 is an elevation, partly in section, showing the clamp, filler block and template assemblies in cooperative relation with the door.

As shown in Fig. 26, the clamping accessory 96 is in the assembled position in which the two locking ears 106, 106, Fig. 24, to the rear thereof have been rotated downwardly about the pressure plate of jaw 38, thus anchoring the clamping accessory 96 to the clamp assembly 27. The triangular member 50 at the end of the lower clamping member 44 is rotated so that it is in its shortened position and is pressed upwardly against the center rib 97b of body member 97. Thus, as the handle 43, Fig. 26, is rotated downwardly, the filler-block or clamping accessory 96 is pressed upwardly against the lower surface of the template frame 36, and the wood block 98 is moved toward the door by jaw 38 and is pressed and locked into position thereagainst. The router 51 is then lowered into the template and the hinge seat is cut.

There are a number of advantages to the described arrangement. The guiding element 99 carried by the filler-block 96 is always moved into predetermined relation with the door and the wood strip 98 is always level with the upper surface thereof with the part of the seat 98a formed therein in alignment with that part of the hinge seat 57 in the door. This insures that the wood block 98 carried by the filler-block 96 always provides support along the open end of the hinge seat to prevent splitting during each routing operation. Door after door may be routed with the same wood block 98 providing the clamp support, in avoidance of all splitting at the edges of the hinge seats.

In order to rout hinge seats for hinges of different sizes, the wood block 98 is preferably provided with four beveled surfaces 107a–107d, Fig. 25. By releasing the thumb nuts 105, 105, the wood block 98 may be reversed to provide a new locking surface 107b, and the wood block 98 may be turned over and reversed endwise to provide two additional locking surfaces 107c, 107d, each inclined face of wood block 98 automatically assuring alignment with the face of the door for the proper alignment with the hinge seat as above described. A new surface should be used only when a different size hinge seat is to be cut. Thus, the one wood block 98 may be used to cut four different size hinge seats and for as many complete operations of each size as desired. While the block 98 has been described as being made of wood, it is to be understood that other suitable materials such as fiberboard or plastic may be used. The block 98 also may be constructed from metal; however, in such case seats should be preformed in the beveled surfaces thereof so as not to damage the routing tool when the hinge seats are being cut in the hinge-receiving edge of the door.

In using the hinge jig assembly with metal frames, it will, of course, be apparent that with hinges welded thereto, adjustments must be made for cutting the hinge seats to correspond with the differing locations of the hinges. However, with metal door frames, all hinges, with practically no exceptions, are arranged with the upper edge of the upper hinge five inches from the upper edge of the door; and the lower edge of the lower hinge is always ten inches from the bottom of the door. If it be assumed that the hinge described in the preceding routing operation was a three and one-half inch hinge, then the next standard size would be a four-inch hinge. Hence, it becomes necessary to insert in the template slide 90 a template 55 with a proper opening for the four-inch hinge, and also to move the template assembly 14, Fig. 2, from the upper end of the door toward the lower end a distance of one-quarter inch to provide for the wider hinge. This is done accurately and rapidly by loosening the locator block 68b on channel 17, Fig. 22a, inverting it, Fig. 23, and sliding it until the hole 108 through the pivoted center member 81 is in alignment with the second hole 110 of the series of small holes in the upper flange of the channel 17.

It will be observed, Fig. 23, there are three small holes 109, 110, 111 illustrated, each one-quarter inch apart, to take care of three and one-half inch, four inch and four and one-half inch hinges, which cover the majority of standard sizes. The openings in the locator block 68b and in the channel 17 correspond with the size of a sixpenny finish nail and all that is necessary is for the operator to drop such a nail through the aligned holes 108 and 110 accurately to position the locator block 68b. The template assembly 14, after loosening the thumb screws 73 and 74, Fig. 20, is then slid along the channel 17 and positioned against the locator block 68b, Fig. 2, after which the thumb screws are tightened. A similar adjustment is made at the opposite end of the frame of the locator block 68b on the channel 15 for proper location of template assembly 12. No adjustment of the center template assembly 13, shown in Fig. 1, will be necessary other than changing the size of the template opening as the assembly 13 will continue to remain in its center location with respect to the other template assemblies 12 and 14. The foregoing operations are repeated for the routing of a hinge seat for the four-inch hinge.

While the adjustments just described have been for a left-hand door, those for a right-hand door will be the same, only they will be made from the opposite end of the hinge jig frame and of the right-hand locator blocks 68a. Thus, for positioning the template assembly 12 the locator block 68a at the right-hand end of the frame as viewed by the operator, Fig. 2, will be moved for alignment with the second hole 113 of the series of small holes 112, 113 and 114 in the upper flange of channel 15, Figs. 4 and 6. A similar adjustment will be made at the opposite end of the frame of the locator block 68a on the channel 17 for proper location of template assembly 14.

It is, of course, to be understood that the arrangement lends itself for hinges mounted in locations other than the five-inch and ten-inch locations heretofore mentioned and that the arrow of the locator block may be utilized for intermediate locations. The above features, however, in terms of the majority of standard assemblies make possible the operation on doors to provide hinge seats with a minimum of lost time in adjustments.

From the foregoing the versatility of the hinge jig assembly is readily apparent, as are the advantages obtained from the provision of such an assembly which, with the minimum of adjustment and manipulation, automatically fixes templates in position for the rapid and accurate routing or cutting of hinge seats in the jamb and in the door.

While there has been described a preferred embodiment of the invention, it will be understood that further modifications may be made without departing from the spirit and scope of the invention as set forth in the appended claims.

What is claimed is:

1. In a hinge jig assembly, means for locating a jamb with reference to a door to provide top clearance for the door when it is hung from the jamb comprising a frame extending longitudinally of the door, supporting means carried by said frame for positioning the jamb lengthwise of the door, a pivoted arm extending transversely of said frame supported at each end of the frame adjacent an opposite end of the door, each arm having a jamb-locating surface thereon, means for holding each said arm out of engaging position with said jamb and for releasing said arm for movement toward said jamb to move said jamb-locating surface against the jamb to predetermine the clearance between the top edge of the door and the top edge of the jamb.

2. In a hinge jig assembly, means for locating a jamb with reference to a door to provide top clearance for the door when it is hung from the jamb comprising a frame extending longitudinally of the door, supporting means carried by said frame for positioning the jamb lengthwise of the door, a pivoted arm extending transversely of said frame supported at each end of the frame adjacent an opposite end of the door, each arm having a jamb-locating surface thereon, means for holding each said arm out of engaging position with said jamb and for releasing said arm for movement toward said jamb to move said jamb-locating surface against the jamb to predetermine the clearance between the top edge of the door and the top edge of the jamb, frame-locating means disposed at the respective ends of said frame and each provided with a control lever for shifting the frame lengthwise of the door to bring an end portion of the frame firmly into engagement with an end of the door for the selective routing of hinge seats for right-hand or left-hand doors.

3. In a hinge jig assembly, means for locating a jamb having a locating dado at one end thereof with reference to a door to provide top clearance for the door when it is hung comprising a frame extending longitudinally of the door, supporting means for the jamb extending from the frame for positioning of the jamb lengthwise of the door, an arm pivoted to the frame adjacent one end thereof, said arm extending transversely of said frame, a spring biasing the arm toward the jamb, means for holding said arm out of engaging position with said jamb and for releasing said arm for movement toward said jamb, said arm having an abutment for engaging one edge of the dado of the jamb and having opposite said abutment an inclined surface for engaging the opposite edge of the dado for moving the dado firmly against the jamb-locating abutment thereof to fix the position of the dado relative to said frame, and means for locating the frame with reference to the door with the top end of the door spaced from the adjacent end of the jamb when said edge of the dado thereof is in the predetermined position against said jamb-locating abutment.

4. In a woodworking apparatus for positioning a jamb having a dado adjacent one end thereof and a door in predetermined relation preparatory to the routing of hinge seats therein, the combination of a frame having a locating surface for positioning the top end of a door, means carried by said frame for applying pressure to said door in a longitudinal direction for biasing the top end of said door against said locating surface, a locating arm pivotally carried by and extending transversely of said frame for positioning the jamb lengthwise of a longitudinal edge of said door, said locating arm having a vertical jamb-locating surface on one side thereof for abutting engagement with an edge of the dado of said jamb and a wedge surface opposite said jamb-locating surface for engagement with the opposite edge of said dado, a support for said jamb, means for clamping said jamb against said door, and spring means for biasing said locating arm toward said jamb for holding said jamb-locating surface and said wedge surface in engagement with the corresponding edges of said dado to prevent longitudinal movement of said jamb during the clamping of said jamb against said door.

5. In a hinge jig assembly, means for locating the jamb with reference to a door to provide top clearance for said door when it is hung comprising a frame, means for supporting said frame on the door, an arm pivoted from and extending transversely of said frame, a jamb-locating surface and a wedging surface on opposite sides of said arm and extending outwardly therefrom for engagement with opposed edges of a dado in the jamb, a spring for biasing said arm toward said jamb, and a latch for holding said arm out of engaging position with said jamb and for releasing said arm for movement against said jamb, said spring cooperating with said arm to lock said latch in a fixed position to hold said arm out of engagement with said jamb.

6. In a woodworking apparatus for positioning a jamb having a dado adjacent one end thereof and a door in predetermined relation preparatory to the routing of hinge seats therein, the combination of a frame having a locating surface for positioning the top end of the door in predetermined position with said frame, means for holding the top end of said door against said locating surface, said frame having supports for positioning the jamb longitudinally of the door, a pivoted locating arm carried by and extending transversely of said frame for positioning the jamb lengthwise of the end of said door, spring means for biasing said arm toward said jamb for holding a jamb-locating surface thereof in engagement with one of the edges of said dado, a clamp carried by said frame and including a body member and a slidable jaw, a crank arm pivoted intermediate its ends on said body member in spaced relation with said jaw and pivotally carrying at one end a cam lever having a cam surface in spaced relation with the pivot of said cam lever, said cam surface being normally below said cam lever pivot in the unclamped position, downward rotation of said lever causing movement of said cam surface against said slidable jaw to rotate the crank arm to supply a lifting action at the opposite end thereof and to the jamb for moving the jamb and said locating arm upwardly to bring the upper surface of the jamb into substantial alignment with the upper longitudinal edge of the door, further movement of said cam surface moving said jaw horizontally to press the jamb against the door, said cam lever thereafter moving to an over-center position with said cam surface above the axis of said cam lever pivot to retain said cam lever and said crank arm in clamped and locked relation with said jamb in its final clamped position against said door.

7. In a hinge jig assembly for positioning a jamb and a door in predetermined relation preparatory to the routing of hinge seats therein, the combination of a frame having a locating surface for positioning the top end of the door relative to said frame, a pivoted locating arm carried by and extending transversely of said frame and having a jamb-locating surface adjacent one end, a spring for biasing said arm and its locating surface downwardly, supports for said jamb extending from said frame for supporting the jamb adjacent the upper longitudinal edge of the door, and clamping means spaced longitudinally of the door and each characterized by the provision of a pair of movable members, means carried by said frame for supporting said members for movement in directions substantially at right angles to each other, one of said members being vertically movable to lift the jamb into alignment with the upper edge of the door and the other of which member is movable horizontally to clamp the jamb in final position without disturbing the lengthwise relation between the jamb and the door as determined by said pivoted arm.

8. In a hinge jig assembly for positioning a jamb and a door in predetermined relation preparatory to the routing of hinge seats therein, the combination of a frame having a locating surface for positioning the top end of the door relative to said frame, a pivoted locating arm carried by and extending transversely of said frame and having a jamb-locating surface adjacent one end, a spring for biasing said arm and its locating surface downwardly, supports for said jamb extending from said frame for supporting the jamb adjacent the upper longitudinal edge of the door, clamping means spaced longitudinally of the door and each characterized by the provision of a pair of movable members adapted to be positioned substantially at right angles to each other, one of which is movable in a direction to lift the jamb into alignment with the upper edge of the door and the other of which is movable transversely of the frame to clamp the jamb in final position without disturbing the lengthwise relation between the jamb and the door as determined by said pivoted arm, a sub-frame supporting said movable clamping members and overlying the jamb and the adjacent edge of said door, and means for securing said sub-frame in fixed position on said frame to arrest upward movement of said jamb thereby initiating said transverse clamping movement.

9. In a hinge jig assembly for a jamb and door, a clamp for clamping the jamb to the door comprising a frame, a clamping member pivoted intermediate its ends at the lower end of said frame for movement of the clamping end thereof upwardly until engagement with the jamb, said clamping end pivotally carrying a foot having a clamping surface thereon, a horizontally movable jaw carried by said frame and biased to disengaged position, said jaw having one end thereof disposed adjacent the end of said clamping member opposite the clamping end thereof, an actuating member including a handle pivoted to said opposite end of said clamping member and having a cam surface in spaced relation with its pivot engageable with said horizontally movable jaw, the pivot of said actuating member being above the camming surface in the disengaged position of said clamp and movable below said camming surface in the engaged position for application of the bias to the handle of said actuating member in a position to lock said clamp in the clamped position.

10. A clamping assembly comprising a body member, a jaw horizontally movable relative to said body member, a spring biasing said jaw to a disengaged position, a latching member carried by said jaw, a pivotal support for said body member for rotation of said body member and said jaw from one position to another about said pivotal support, and structure forming a locking recess carried by said pivotal support engaging and retaining said latching member against the bias of said spring upon rotation of said body member from said one position to said other position thereby to retain said body member in its last-named position.

11. In a hinge jig assembly for a door and a jamb, a sectional frame supported by said door comprising a right end section, a left end section, and a center section, means for securing said sections in fixed endwise engagement, said end sections being provided with means for clamping said frame to said door, each of said end sections having a door end-locating means for locating the top of said door with respect to the corresponding end of said hinge jig comprising a locating surface, a pressure-applying member extending beyond said surface, means for retracting said member to a position behind said locating surface, said member of said door end-locating means adjacent the top end of said door being in its retracted position, and said member of said door end-locating means adjacent the bottom end of said door being in its extended position for pressing the top end of said door against the locating surface of the corresponding door end-locating means.

12. A sectional frame for a hinge jig assembly comprising a right end section, a left end section and a center section, said end sections being adapted for overlapping engagement with the corresponding ends of said center section, said end sections being provided with openings for alignment with openings in said center section for adjusting the length of said frame to doors of standard lengths, threaded rods adapted to be inserted in each of said aligned openings for locking said sections in a fixed position to provide a frame of preselected length, each of said rods having a handle for rotation thereof, each said handle projecting radially from said rod and being rotatable about its own axis to loosen it on said rod and rotatable about the axis of said rod for adjusting the angular position of said handle with respect to the longitudinal axis of said frame without rotation of said rod, and said handles providing means for lifting said hinge jib assembly onto and off of a door.

13. A hinge jig assembly for simultaneously routing hinge seats in a door jamb and a door comprising a longitudinal frame member having a length at least equal to that of the door, template assemblies adjustably secured to said frame and extending over the edge of the door in which the hinge seats are to be formed and providing for temporary support of the frame on the door, an end-locator at each end of said frame having door-locating surfaces and a retractable arm for engaging one end of the door to press the opposite end of the door against a door-locating surface to fix the position of the frame relative to the door, door-engaging clamps at each end of said frame for clamping the frame to the door in fixed relation therewith, said frame having at the respective ends thereof jamb-supporting brackets extending outwardly from the frame in a direction away from the frame for support of a jamb thereon, a jamb-locating arm disposed at each end of said frame for engaging a jamb placed upon said brackets to position said jamb relative to said door to provide end-clearance, each of said template assemblies including a support extending outwardly of the door and away from the frame, a clamping assembly rotatably mounted on each of said supports, means for holding each clamping assembly in an elevated position and out of interference with the jamb during positioning thereof on said brackets, each of said clamping assemblies being rotatable about its support and each having a crank arm pivoted intermediate its ends, one end of which is movable into clamping engagement with the jamb with said assembly in its lowermost position, each said clamping means having a slidably jaw for engaging an edge of the jamb, and an operating lever including a cam surface cooperatively associated with said crank arm and said jaw for first rotating said crank arm about its pivot to raise the jamb upwardly into abutting relation against the overlying template assemblies and upon the jamb being brought to rest against said assemblies for thereafter actuating said jaws to press said jamb against the side of the door and in position for the routing of hinge seats in the jamb and in the door.

14. A hinge jig assembly for simultaneously routing hinge seats in a door jamb and a door comprising a longitudinal frame member having a length at least equal to that of the door, template assemblies adjustably secured to said frame and extending over the edge of the door in which the hinge seats are to be formed and providing for temporary support of the frame on the door, an end-locator at each end of said frame having door-locating surfaces and a retractable arm for engaging one end of the door to press the opposite end of the door against a door-locating surface to fix the position of the frame relative to the door, door-engaging clamps at each end of said frame for clamping the frame to the door in fixed relation therewith, said frame having at the respective ends thereof jamb-supporting brackets extending outwardly from the frame in a direction away from the frame for support of a jamb thereon, each of said template assemblies including a subframe having one section extending downwardly along the side of the door and another section extending horizontally over said upper edge of the door, the two sections of said subframe being disposed at an angle one to the other substantially greater than ninety degrees to provide hinge clearance, said horizontally extending section of said subframe having a lower surface including a straight portion of less length than the thickness of a door and which portion extends at right angles to the adjacent door-engaging surface of the downwardly extending section of the frame to conform with a door whose upper edge is disposed at right angles to the sides thereof, said lower surface extending beyond said straight portion thereof being parallel to the upper surface of said horizontally extending section of said frame for so positioning in said jig assembly a door with a bevelled edge to provide hinge clearance.

15. In a woodworking apparatus for supporting a jamb and a door in predetermined relation for the routing of hinge seats therein having a frame, a template assembly and a clamping assembly, a clamping accessory to take the place of a jamb during the operation of said apparatus for the routing of hinge seats in a door only comprising a body member slidably carried on the underside of said template assembly, a block carried by said body member and engageable with the abutting portion of the edge of said door, a guiding element carried by said body member in cooperative relation with the template in said template assembly to alter the effective area of the opening in said template, a pin carried by said body member for cooperation with a groove in the under surface of said template assembly to accurately maintain the position of said clamping accessary with respect to said template assembly, and means for locking said clamping accessory to the horizontally movable jaw of said clamping assembly to maintain said accessory and said jaw in abutting relation for horizontal movement of said accessory in response to movement of said jaw to press said block against said abutting portion of said door when said clamping assembly is in its clamped position for the routing of a hinge seat in said door and to withdraw said block from engagement with said door when said clamping assembly is operated to its released position.

16. The combination with a hinge jig assembly including a frame having a relatively thin elongated member extending lengthwise thereof for the support of template assemblies thereon, of template assembly locator blocks including a slot for receiving said elongated member, each block having a member extending through one face thereof for complementary engagement with openings provided in said elongated member, each said block having a pivoted jaw in the form of a crank having a pair of arms, a clamping screw extending through one arm of the crank into engagement with the body portion of the block for rotating the crank about its pivotal support and bringing the other arm of said crank into clamping engagement with said elongated member, said other arm of said crank having indicia marked thereon for cooperative relation with a scale provided on said elongated member.

17. In a jig assembly for the routing in predetermined location of hinge seats in left-hand or right-hand doors the combination comprising a longitudinal frame having a locating surface at each end thereof for respectively engaging the ends of the door to position each door lengthwise of said longitudinal frame with respect to the end-locating surface corresponding with the left-hand or right-hand swing of the door, at least one template assembly for routing a hinge seat mounted on said longitudinal frame and slidable lengthwise thereof, at least one pair of adjustable stops carried by said longitudinal frame and positioned on opposite sides of said template assembly, each of said stops comprising a body member projecting outwardly from said longitudinal frame, means for locking said body member to said longitudinal frame, one of said stops providing an abutment for locating said template assembly with respect to said locating surface at one end of said longitudinal frame for the routing of hinge seats in a right-hand door, the other of said stops providing an abutment for locating said template assembly with respect to said locating surface at the opposite end of said longitudinal frame for the routing of hinge seats in a left-hand door, and said template assembly having means for clamping said assembly to said longitudinal frame and against the selected one of said stops to prevent further movement of said template assembly.

18. A clamp for wood-working apparatus comprising a body member having a slidable jaw, a substantially C-shaped member pivotally secured intermediate its ends to said body member and in spaced relation with said jaw, said C-shaped member pivotally carrying at one end a clamping element having limited oscillating movement, said clamping element being pivoted at an off-center location and movable between two positions to change the effective length of said C-shaped member relative to its pivotal connection to said body member, operating means between the other end of said C-shaped member and said slidable jaw, and means for actuating said operating means for causing movements of both said slidable jaw and said clamping element, said movements being substantially at right angles to each other.

19. A jamb moving and clamping assembly for wood-working apparatus comprising a template frame adapted to be supported on a longitudinal edge of a door for overlying said edge and a jamb, a body member depending from said template frame and having a horizontally slidable jaw, a crank arm pivoted intermediate its ends to said body member at a point below said slidable jaw, one end of said crank arm being adapted for disposition beneath the jamb, a clamping foot pivotally secured adjacent one of its ends to said one end of said crank arm and movable between two positions to change the effective length of said crank arm relative to its pivotal connection to said body member and to change the position of engagement of said clamping foot with respect to the jamb, said template frame of said assembly limiting upward movement of the jamb, and lever means carried by the opposite end of said crank arm and engageable with said slidable jaw for moving said clamping foot against the jamb to bring the latter against said template frame for applying pressure to said slidable jaw to clamp the jamb against the door.

20. A sectional frame for a hinge jig assembly comprising a right end section, a left end section and a center section, said sections being formed of channels and said end sections being adapted for overlapping engagement with the corresponding ends of said center section, said end sections being provided with spaced structure projecting from opposite sides of the channel and having aligned openings, one of said openings being threaded, threaded rods adapted to be inserted in each of said aligned openings and having structure cooperating with said spaced structure to provide a squeezing action for locking said sections in a fixed position to provide a frame of preselected length corresponding to the length of a door, each of said rods having a handle for rotation thereof, each handle projecting radially from said rod and being rotatable about its own axis to loosen it on said rod and rotatable about the axis of said rod for adjusting the angular position of said handle with respect to the longitudinal axis of said frame without changing the locked condition of the sections of said frame, and said handles providing means for lifting said hinge jig assembly onto and off of a door.

21. In a hinge jig assembly the combination of a jig frame adapted to be secured to a longitudinal edge of a door, a template assembly carried by said frame and having a clamping means depending therefrom, and a clamping accessory including locking means slidably carried by said template assembly and engageable with the door, said clamping means including a pair of clamping elements movable at substantially right angles to each other, said clamping accessory being locked to one of the clamping elements of said clamping means and engageable by the other of said clamping elements for forcing said clamping accessory against the underside of said template assembly and against an abutting portion of the door when said clamping means is in its clamped position to provide support for said portion during the routing of a hinge seat in the door and to withdraw said clamping accessory from engagement with the door when said clamping assembly is operated to its released position.

FRED SCHWARZER.

REFERENCES CITED

The following references are of record in the file of this patent:

UNITED STATES PATENTS

| Number | Name | Date |
|---|---|---|
| 98,765 | Hall et al. | Jan. 11, 1870 |
| 1,042,777 | Fernandez | Oct. 29, 1912 |
| 1,137,109 | Arneson | Apr. 27, 1915 |
| 1,145,514 | Schiek et al. | July 6, 1915 |
| 1,490,063 | Tower | Apr. 8, 1924 |
| 1,555,652 | Frame | Sept. 29, 1925 |
| 1,583,611 | Seely | May 4, 1926 |
| 1,642,474 | Willoughby | Sept. 13, 1927 |
| 1,644,666 | Carter | Oct. 11, 1927 |
| 1,788,256 | Sherwin | Jan. 6, 1931 |
| 2,355,603 | Zern | Aug. 8, 1944 |
| 2,374,899 | Sasgen | May 1, 1945 |
| 2,427,081 | Zern | Sept. 9, 1947 |